US012783728B2

(12) United States Patent
Sheffield et al.

(10) Patent No.: US 12,783,728 B2

(45) Date of Patent: Nov. 3, 2026

(54) SYSTEMS AND METHODS FOR DE-IDENTIFYING AND TRANSFORMING DATA REPRESENTATIONS FOR DATA QUERIES WHILE MAINTAINING DATA PRIVACY

(71) Applicant: Intercontinental Exchange Holdings, Inc., Atlanta, GA (US)

(72) Inventors: John M. Sheffield, Melrose, MA (US); Robert Sinnott, Boston, MA (US); Vivek Vaghela, Ahmedabad (IN)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

(21) Appl. No.: 19/179,618

(22) Filed: Apr. 15, 2025

(65) Prior Publication Data

US 2026/0220303 A1 Jul. 30, 2026

Related U.S. Application Data

(60) Provisional application No. 63/662,042, filed on Jun. 20, 2024.

(51) Int. Cl.
*G06F 21/62* (2013.01)
*G06F 40/205* (2020.01)

(52) U.S. Cl.
CPC ........ *G06F 21/6254* (2013.01); *G06F 40/205* (2020.01)

(58) Field of Classification Search
CPC ........................... G06F 21/6254; G06F 40/205
(Continued)

(56) References Cited

U.S. PATENT DOCUMENTS 10,496,638 B2 * 12/2019 Wang .................. G06F 16/2453
12,073,001 B1 * 8/2024 Mico ................... G06F 21/6254
(Continued)

FOREIGN PATENT DOCUMENTS

JP 2024540941 A * 11/2024 ............. H04L 9/088

OTHER PUBLICATIONS

Comiskey, John, "Linking 23 Million Active Mortgage Records to Borrower Demographics The Remarkable Privacy, Mortgage Refinance, and MBS Prepayment Implications," https://johncomiskey.substack.com/p/linking-23-million-active-mortgate, Dec. 30, 2024, nine (9) pages.

*Primary Examiner* — Aubrey H Wyszynski
(74) *Attorney, Agent, or Firm* — DLA Piper LLP (US)

(57) ABSTRACT

De-identification and transformation systems and methods are provided. Raw data may be tokenized to raw tokens may include a controlled infinite vocabulary of standardized tokens with materialized uncertainty. The raw tokens may be converted to raw hash values of an infinite vocabulary, which may be joined across the multiple data sources to create synthetic composite hashed records ("SynCHRs"). A raw embedding may be generated using a woven encrypted locality-sensitive hashing ("WELSH") process. The raw embedding may comprise an array of floating point numbers representing the SynCHRs in a vector space that may not be mapped in reverse. One or more SynCHRs having a similarity to a target record may be identified via an indexed vector search. Features of the one or more SynCHRs may be aggregated and appended to the target record, without identifying the record or records used to create the aggregated feature internally or externally to the process.

30 Claims, 12 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 12,182,307 | B1 * | 12/2024 | Li | G06F 16/33 |
| 12,596,841 | B2 * | 4/2026 | Schmidtler | G06F 21/6254 |
| 2023/0260614 | A1 * | 8/2023 | Kromelow | G16H 50/20<br>705/2 |
| 2024/0241990 | A1 * | 7/2024 | Khan | G06F 16/221 |

* cited by examiner

SYSTEMS AND METHODS FOR DE-IDENTIFYING AND TRANSFORMING DATA REPRESENTATIONS FOR DATA QUERIES WHILE MAINTAINING DATA PRIVACY

TECHNICAL FIELD

The present disclosure generally relates to data privacy and in particular to systems, methods, and non-transitory computer readable medium for a multi-step process of de-identifying raw data containing sensitive information and transforming its digital representations in a manner that complies with privacy-related use rights and prohibits re-identification while still allowing for modeling of inherent characteristics of the underlying raw data under specific analytic methods.

BACKGROUND

Data de-identification is a method of data masking that removes personally identifiable information (PII) from a document, media source, or other data record. The idea is that the privacy of individuals whose data is being used can be preserved if information that allows those individuals to be identified is removed. However, there are a number of challenges inherent to building and maintaining a process for data de-identification, including the initial configuration of methods of de-identification, changes to data over time which require ongoing adjustments, ensuring adequate privacy protection, and achieving data utility in output data.

Today's data is complex, multi-dimensional, and distributed across multiple divergent sources. Combined with evolving regulatory requirements, conventional methods of data de-identification (e.g., the use of masking values, rounding values, dropping fields, and/or storing data in separate systems) once relied on to de-identify data are no longer sufficient. Further, conventional methods, such as K-anonymity, may not sufficiently de-identify data. For example, given a set of quasi-identifiers, it may be possible to piece together or reconstruct PII from a dataset. An adversary may simply need to identify a field in the dataset that was not considered a quasi-identifier but which does appear in another data set. Since it is hard to imagine what data appears in or may someday be published in other data sets, the privacy guarantees afforded by K-anonymity are fragile. In addition, conventional methods like K-anonymity and even differential privacy may introduce statistical variation in the data that can alter the results of a data analysis in ways that make the analysis ineffective. For example, if the data doesn't take relationships into account or is inconsistently masked across tables, or differential privacy correlation structures are incorrectly specified, the utilization of the entire database may be impacted, which defeats the purpose of trying to have useful test data (e.g., for modeling of inherent characteristics).

SUMMARY

Aspects of the present disclosure relate to systems, methods, and non-transitory computer readable medium for a multi-step process of de-identifying and analyzing raw data containing sensitive information in a manner that rigorously complies with privacy-related use rights and combination restrictions and prohibits re-identification while still allowing for analysis of inherent characteristics of the underlying raw data.

A de-identification and transformation system comprising a processing device and a memory storing computer-readable instructions, may receive raw data from multiple data sources. The raw data may be tokenized to raw tokens comprising a controlled vocabulary of standardized tokens with materialized uncertainty. The raw tokens may be converted to raw hash values of an infinite vocabulary. The raw hash values may be joined across the multiple data sources to create synthetic composite hashed records ("SynCHRs"). A raw embedding may be generated using a woven encrypted locality-sensitive hashing ("WELSH") process. The raw embedding may comprise an array of floating point numbers representing the SynCHRs in a vector space that may not be mapped in reverse to the underlying input values that generated the embedding. The raw embedding may be stored in an embedding vector database. One or more SynCHRs of the SynCHRs having a similarity to a target record may be identified via an indexed vector search of the embedding vector database. Features of the one or more SynCHRs may be aggregated to form an aggregated feature. The aggregated feature may be appended to the target record.

DETAILED DESCRIPTION

Figure 1:
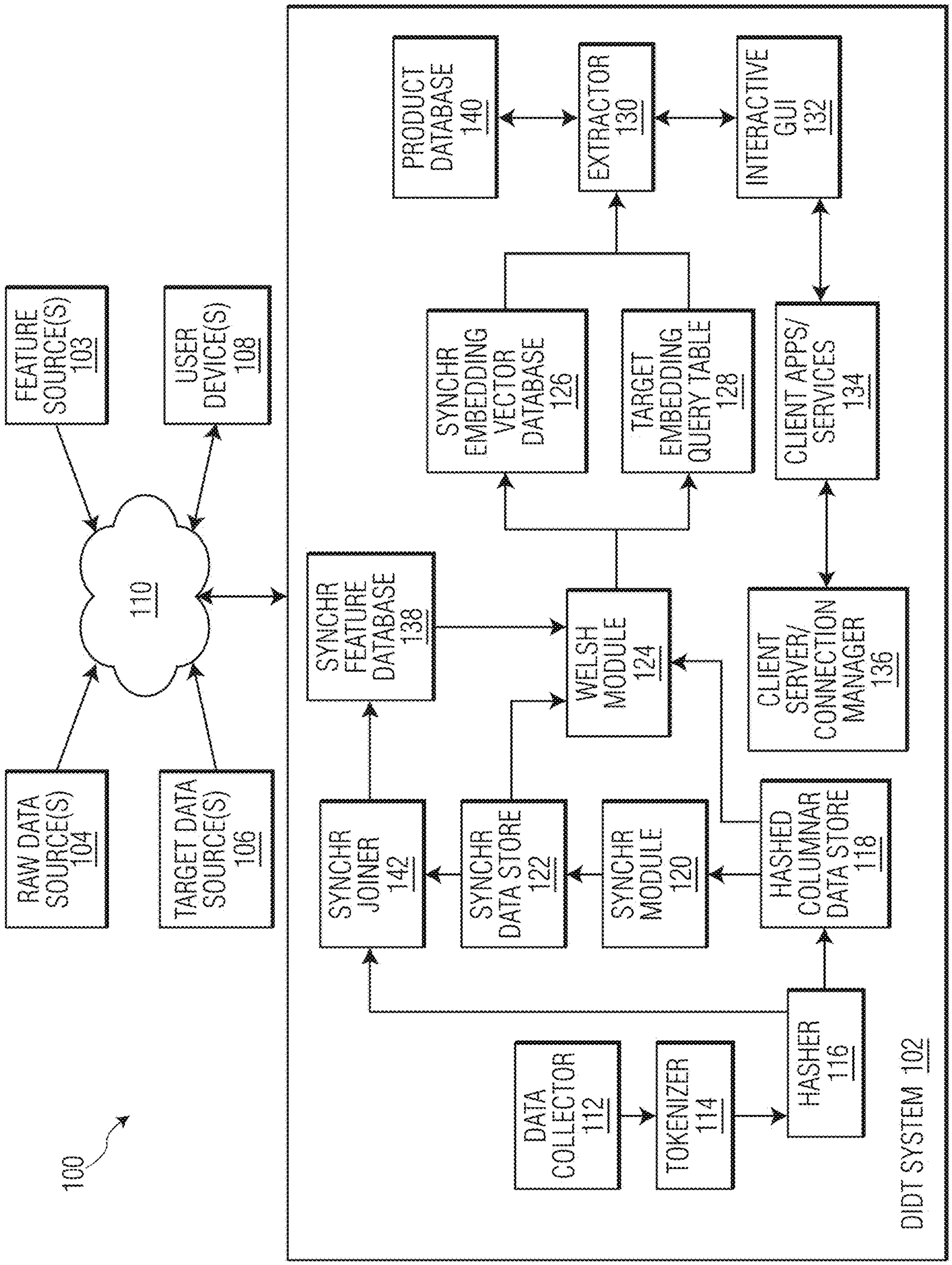
FIG. 1 is a functional block diagram of an example de-identification and transformation environment, according to an example of the present disclosure.

The present disclosure will now be described more fully hereinafter with reference to the accompanying drawings, which form a part hereof, and which show, by way of non-limiting illustration, certain examples. Subject matter may, however, be described in a variety of different forms and, therefore, covered or claimed subject matter is intended to be construed as not being limited to any examples set forth herein. Among other things, subject matter may be described as methods, devices, components, or systems. Accordingly, examples may take the form of hardware, software, firmware, or any combination thereof (other than software per se). The following detailed description is, therefore, not intended to be taken in a limiting sense.

As discussed above, conventional methods of data de-identification may include the use of masking values, rounding values, dropping fields, and/or storing data in separate systems. The present disclosure is related to systems, methods, and non-transitory computer readable medium for a multi-step process of de-identifying raw data containing sensitive information and transforming its digital representations in a manner that complies with privacy-related use rights and prohibits re-identification while still allowing for modeling of inherent characteristics of the underlying raw data under specific analytic methods. In contrast to conventional methods, the examples described herein may include the removal of information content via hashing in a manner that permits similarity association and analysis of records with no way to back-link or de-compile to original source data.

The examples described herein may mitigate or avoid potential concerns about the combination of the raw data from multiple sources leading to the re-identification of previously de-identified datasets. In a non-limiting example, the raw data may include loan (e.g., mortgage) information, property information, and notable event data throughout the loan lifecycle. For example, the raw data may include information about one or more of home sale listings and buyer search, new loan applications or rate locks, electronic lien creation and deed recordings, secondary sale and securitization of an underlying loan asset, loan servicing histories, construction liens, renovation or building permits, zoning exemptions, climate risk, short term and long-term rental listings, condemnations, or energy efficiency metrics, among others. This raw data may contain private information and may be subject to restricted use and data combination rights, regulations, laws, etc., meant to maintain surrounding privacy (e.g., privacy regulations and/or data rights held by data contributors).

The proposed process may allow for the removal of the source information and therefore the removal of any intermediate resulting set of data that may potentially lead to re-identification of the source records. At the same time, the process may preserve the ability to analyze and associate specific non-sensitive components of that information across sources through the reprojection of ancillary information into a latent proximity-preserving embedding space. This may allow for in-process preservation of de-identification in the analysis of multiple raw sources. It may be that each source in isolation may be accessible under certain data rights. However, in conventional systems, combinations across sources may inadvertently remove deidentification or violate data rights if not handled properly. The techniques described herein may allow for the association and analysis of ancillary information from other records while destroying any link to personally identifiable or sensitive information, which goes far beyond conventional de-identification.

The techniques described herein may include re-projecting de-identified (but still potentially) sensitive raw data into a latent embedding space which may preserve only the relevant information required for relevant analysis. This process may be applied to classes of data associated with other technical fields aside from financial data where the ability to perform further analysis on sensitive data while maintaining data privacy may be beneficial, such as, without being limited to medical data, educational data, internet data, locational data, political data, demographic data, etc. The reprojection to a latent embedding space may result in record similarity/proximity being measurable while record contents, which may be traceable to raw source information, are conclusively removed.

It may be difficult to use raw data for any sort of modeling under normal conditions because of legal, regulatory, or contractual restrictions regarding the combination of the raw data. Such restrictions may include restrictions that prevent: 1) combination data that reidentifies PII; 2) combination of data that enables re-identification by internal or external actors; 3) combination of data that inherently increases or amplifies the relative degree of identity precision. Specific use terms may be license-by-license for this type of raw data, but typically the raw data may not be used in any manner that could allow for one or more of: reidentification of borrowers or their properties, disclosure of the identities of entity customers, users, or counterparties, a creation of or increase in reidentification risk to a borrower or entity customer by amplifying a precision of any published disclosure data. For example, if information regarding a loan's collateral's geographic location in a given state is disclosed by the issuer, there may be prohibitions against amplifying the precision to a zip code. These restrictions may also apply equally to any internal use of the raw data and to external/derivative works that an entity may wish to publish.

Accordingly, there is a need for a process to completely and irreversibly de-identify this type of raw data in a manner that still allows for the processing/analysis/querying of the underlying characteristics of the raw data without additional amplification risk. Classes of analysis where the desired results are not tied to individual records, and where analytics regarding general aggregate characteristics of similar records are what is sought, are particularly well suited to this approach.

The following description may use the following methods and terminology associated with machine learning, including natural language processing (NLP) and/or Large Language Models (LLMs). More specifically, the following terms may be used herein.

"Tokenizing," "token," "embedding," "encoding," and "vocabulary." The first step in language modeling may be tokenizing: mapping parts of input text data (a word, word part, phrase, etc.-collectively, tokens) to a large vector. This vector may represent the vocabulary, or a finite set of known tokens. Tokenizing may convert a sentence into a well-defined data array, or more complex data structure.

"Space partitioning," "vector search," and "cosine similarity." Statistical and machine learning models may be framed as space partitioning. They may define some formula over inputs that maps the inputs to a new vector space where points closer together exhibit stronger similarity in characteristics (unsupervised) or outcomes/behaviors (supervised). For example, a comparison of the token embedding for "banana" and "plantain" may be very similar, despite their differences in spelling and etymological origins. From this space, a model may extract information to make predictions. For example, for a new datapoint, average values of neighboring points may be found from previous observations (e.g., a K-nearest-neighbor model). For high-dimensional spaces (i.e., data observations that have many inputs), cosine similarity may be used as a robust measure of proximity, and to use indexed vector search techniques (e.g., in specialized databases). For a set of "query points" (i.e., new observations), a vector search may retrieve the nearest neighbors in high-dimensional space from a set of "reference points." The term "nearest" means "highest cosine similarity over the vectors defining the points' locations in space."

"Hashing" and "salting." Hash functions may be used for one-way conversion of any input value (e.g., "password") to a unique output value of fixed size and format (e.g., "NWY0ZGNjM2I1YWE3NjVkNjFkODMyN2RlYjg4Mm NmOTk="). Only the word "password" may produce that hash, and the hash cannot be reversed to "password." For additional security, hashes may be salted where secret keys (e.g., "abc") may be concatenated with the input text (e.g., "password") to produce an entirely new hash (e.g., "ODIyM2ZlOGRjMDUzM2M2ZWJiYjcxN2U3ZmRhMjg zM2M="). For the purposes of this disclosure, hashing may mean that one unique input is mapped irreversibly to one unique output and knowledge of the output reveals no information about the input.

The combination of these tools and methods of tokenization and hashing may provide a mechanism where information from separate records may be analyzed for a determination of "similarity," while simultaneously destroying any interpretability of the individual processed record and the absolute ordinality of the input. For example, this process may allow the holder of a "banana" token to understand that it is similar to a set of other records that may contain "plantain." However, the holder may not know whether the other records contain "banana," "plantain," any other member of the Musaceae family. Additionally, the spatial partitioning may mean that while "banana" and "plantain" may be considered similar, "banana" and "pineapple" may be considered no more similar than "banana" and "truck". Importantly, the holder may not know that this similarity was measured based on the "banana" token specifically, rather than other potential features of the record. In other words, the present disclosure may allow for the determination of local similarity without exposing what specific features were similar, nor allow for broader extrapolations based on the embeddings themselves.

This mechanism may allow for conditional estimations of local similarity to be measured, while actively avoiding a global similarity metric, to be informative between arbitrary vectors. In the classic example of an informative embedding space with global similarity and interpretability, an embedding vector representation of "king" would be very similar to the embedding vector of "queen" minus the embedding vector of "woman" plus the embedding vector of "man." In contrast, here the result of that sum and difference may just as likely be "petunia" or "phlegm" as it is to "king."

The present embedding space may be a continuous or discrete space of hashed values where similarity is defined based on an arbitrary vector space with a plural membership model of those hashed values, rather than on raw proximity. In this way, it may allow for the creation of either a discrete or continuous similarity score. Unlike conventional LLM-based embeddings, the embedding space described herein may not be additive and the relative locations of two records in the embedding space may not be informative unless their values have some correspondence in these memberships. In other words, unlike embeddings frequently applied in LLMs, these embeddings based on hashes may not be informative on their own and may not be inverted from the embedding to any related concept or record. As a result, it may be well suited for use cases where useful non-sensitive information is associated with sensitive information in records that need to be analyzed without risking the combination of the sensitive information with other data sources.

FIG. 1 is a functional block diagram of an example de-identification and transformation environment 100 (environment 100 herein) is shown. The environment 100 may include a data de-identification and transformation (DIDT) system 102, one or more raw data sources 104, one or more target data sources 106, one or more feature sources 103, and one or more user devices 108 (associated with at least one user). The DIDT system 102 may be configured to perform a de-identification and transformation process 200 (shown in FIG. 2). In some examples, one or more components of environment 100 (e.g., the DIDT system 102, the one or more raw data sources 104, the one or more target data sources 106, the one or more feature sources 103, and/or the one or more user devices 108) may be communicatively coupled via one or more networks 110. The one or more networks 110 may include, for example, a private network (e.g., a local area network (LAN), a wide area network (WAN), intranet, etc.) and/or a public network (e.g., the Internet).

In general, the one or more raw data sources 104, the one or more target data sources 106, and the one or more feature sources 103 may include a server computer, a desktop computer, a laptop, a smartphone, or any other electronic device known in the art configured to capture data, receive data, store data and/or disseminate any suitable market data. While shown as separate components, the one or more raw data sources 104, the one or more target data sources 106, and the one or more feature sources 103 may be part of a same data feed.

The one or more user devices 108 may include, without limit, any combination of mobile and/or stationary communication device such as mobile phones, smart phones, tablets computers, laptop computers, desktop computers, server computers or any other computing device configured to capture, receive, store and/or disseminate any suitable data. In some examples, the one or more user devices 108 may include one or more external computer systems configured to receive data as processed by the DIDT system 102, and may provide additional analysis, user interaction and/or distribution functionality. In an example, the one or more user devices 108 may include a non-transitory memory, one or more processors including machine readable instructions, a communications interface which may be used to communicate with the DIDT system 102, a user input interface for inputting data and/or information to the one or more user devices 108 and/or a user display interface for presenting data and/or information on user devices. In an example, the one or more user devices 108 may also be configured to provide an interactive GUI 132 of the DIDT system 102 on the GUI of the one or more user devices 108. In some examples, the one or more user devices 108 may include computer system 1100 (shown in FIG. 11).

The DIDT system 102 may include data collector 112, tokenizer 114, hasher 116, hashed columnar data store 118, SynCHR module 120, SynCHR data store 122, SynCHR joiner 142, SynCHR feature database 138, WELSH module 124, SynCHR embedding vector database 126, target embedding query table 128, extractor 130, product database 140 interactive GUI 132 and client apps/services 134. In some examples, the one or more components 112-142 of the DIDT system 102 may communicate with each other via a data and control bus (not shown). Although the DIDT system 102 is shown in FIG. 1 as one component (e.g., a server), the DIDT system 102 may include one or more components (e.g., one or more servers), whether co-located or linked across one or more networks.

Although not shown, the DIDT system 102 may include at least one processor (e.g., processing device 1102 shown in FIG. 11) and non-transitory memory (e.g., memory 1106 shown in FIG. 11) storing one or more routines and or algorithms for performing the functions of the DIDT system 102 described herein. An example implementation of one or more components of the DIDT system 102 is shown by computer system 1100 (shown in FIG. 11).

In some examples, the DIDT system 102 may obtain raw data, target data, and feature data (which may be in a plurality of different formats) from among the respective one or more raw data sources 104, the one or more target data sources 106, and the one or more feature sources 103 via the data collector 112. Although not shown, the data collector 112 may include one or more input and/or output interfaces (e.g., an electronic device including hardware circuitry, an application on an electronic device) for communication with other components of environment 100 (e.g., the one or more feature sources 103, the one or more raw data sources 104 and the one or more target data sources 106 and in some examples the one or more user devices 108).

The data collector 112 may be configured to obtain the obtain raw data, target data, and feature data through any suitable electronic data collection technique. For example, the data collector 112 may obtain data through or more data feeds (including streaming (live) data feeds), one or more file transfers (including, in some examples, one or more secure file transfers), by data being pushed to the DIDT system 102 and/or by the DIDT system 102 pulling and/or extracting data and/or information from among the respective one or more raw data sources 104, the one or more target data sources 106, and the one or more feature sources 103. In some examples, the data collector 112 may include security protection (e.g., encryption, decryption) to protect the integrity of the obtained data.

In some examples, the data collector 112 may perform one or more of filtering, data normalization, data reformatting, data aggregation and the like. In some examples, electronic data that may be obtained by the data collector 112 may include data that may be unable to be processed, data that includes one or more errors and the like. In some examples, the one or more raw data sources 104, the one or more target data sources 106, and the one or more feature sources 103 may transmit data with various unique, non-standard values and/or data formats (e.g., proprietary formats). Furthermore, data content may correspond to different forms of data, such as different currencies, date formats, time periods, etc.

Non-limiting examples of data filtering that may be performed by the data collector 112 may include excluding null data values, excluding corrupted data, excluding outlier data values (e.g., a data value outside of a pre-defined value range, outside of a pre-defined time range) and the like.

In some examples, the data collector 112 may reformat the collected data to one or more common formats and/or normalize the collected data. In some examples, the data collector 112 may be configured to aggregate and/or combine at least a portion of the collected data (e.g., according to one or more pre-defined categories (such as a type of data, one or more predetermined time periods, etc.)). The data collector 112 may normalize location data received from different sources to ensure that naming/categorization of the data is consistent (e.g., always "USA" and not "U.S.A.", "United States", "America", etc.). This may allow the data to be processed in a consistent, normalized manner, regardless of the original data source.

The tokenizer 114 may receive the data from the data collector 112 and may perform a tokenizing process 202 to generate a controlled vocabulary of tokens with materialized uncertainty. The tokenizing process 202 is described further below with respect to FIG. 2.

The hasher 116 may perform a hashing process 204 to convert the standardized tokens from human-readable forms to an infinite vocabulary of hash values containing no human-readable or reverse-engineerable content. The hasher 116 may generate hashes that are stored in a hashed columnar data store 118. The hashing process 204 is described further below with respect to FIG. 2.

The SynCHR module 120 may perform a SynCHR process 206 on the hashed outputs to create SynCHRs that are stored in one or more of the SynCHR data store 122 and the SynCHR feature database 138. The SynCHR process 206 is described further below with respect to FIG. 2.

The SynCHR joiner 142 may be used to associate feature data with SynCHRs. In an example, the SynCHR joiner 142 may associate a property ID hash with one or more SynCHRs, such that the one or more SynCHRs represent a feature such as climate risk data.

The woven encrypted locality-sensitive hashing ("WELSH") module 124 may retrieve one or more of hashes from the hashed columnar data store 118 and SynCHRs from one or more of the SynCHR data store 122, and the SynCHR feature database 138 and perform a WELSH process 208 to form a locally sensitive but globally hashed dataset that may be used in specific types of associative querying and analysis (i.e., WELSH embeddings). The WELSH embeddings may be stored in one or more of a SynCHR embedding vector database 126 and a target embedding query table 128. The WELSH process 208 is described further below with respect to FIG. 2.

The extractor 130 may perform an indexed vector search extraction process 210 to extract products from one or more of the SynCHR embedding vector database 126 and the target embedding query table 128, and associate features to target records without linking datasets in a manner that may reidentify or enable backward linking of their constituent records. The indexed vector search extraction process 210 is described further below with respect to FIG. 2.

In an example, one or more of the tokenizer 114, the hasher 116, the SynCHR module 120, the WELSH module 124, and the extractor 130 may be connected to one or more backend servers. Although not shown, one or more of the tokenizer 114, the hasher 116, the SynCHR module 120, the WELSH module 124, and the extractor 130 may include a controller (e.g., at least one processor, a microcontroller and the like, such as processing device 1102 shown in FIG. 11) and non-transitory memory (e.g., memory 1106 shown in FIG. 11) storing one or more routines and or algorithms for performing the functions described herein. An example implementation of one or more components of the tokenizer 114, the hasher 116, the SynCHR module 120, the WELSH module 124, and the extractor 130 is shown by computer system 1100 (shown in FIG. 11).

The interactive GUI 132 may be configured to generate and display one or more widgets/applications in one or more windows. In some examples, the interactive GUI 132 may include different configurations based on an underlying application and/or service for which it is launched. For example, the interactive GUI 132 may have a first configuration for a mobile application, may have a second (different) configuration for a desktop application and may have a third (different) configuration for a spreadsheet application. In some examples, the interactive GUI 132 may include one or more windows with different configurations.

In some examples, one or more of the hashed columnar data store 118, SynCHR data store 122, SynCHR embedding vector database 126, and target embedding query table 128 may include storage (e.g., one or more databases) to store any parameters, configurations, functions and/or other suitable data and/or information that may be useful.

In some examples, the DIDT system 102 may include client application(s)/service(s) 134 for creating instances of application(s) and/or service(s) for distributing data to user device(s) 108. In an example, the client application(s)/service(s) 134 may include one or more of a trading desktop, a spreadsheet application, a mobile application (e.g., an application that may be suitable for a display screen of a mobile device such as a smartphone) streaming (e.g. raw, normalized, filtered and/or aggregated) data feeds and/or one or more APIs for receiving data in one or more object-oriented programming languages (e.g., Java, Python™, R, etc.). In some examples, the client application(s)/service(s) 134 may create instance(s) of application(s) and/or service(s) including interactive GUI 132. In some examples, the DIDT system 102 may be configured to expose a presentation package to one or more API(s) among client application(s)/service(s) 134.

In some examples, the DIDT system 102 may include a client/server connection manager 136 (also referred to as connection manager 136) configured to manage client to server connection requests. In general, connection manager 136 may manage connection request(s) of user device(s) 108 to the DIDT system 102 to access client application(s)/service(s) 134.

Figure 2:
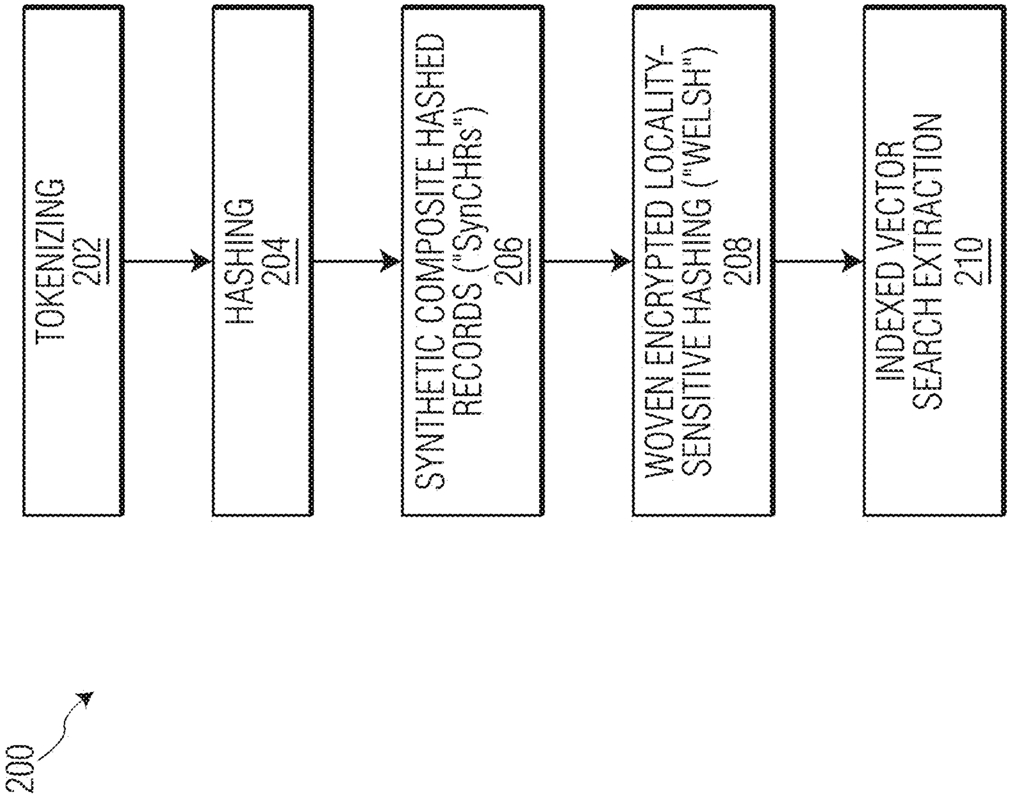
FIG. 2 is a flowchart illustrating a de-identification and transformation process, according to an example of the present disclosure.

Referring now to FIG. 2, a flowchart illustrating the de-identification and transformation process 200 is shown. The de-identification and transformation process 200 may begin with the tokenizing process 202. Raw data (e.g., loan data) may be received from one or more sources (e.g., the one or more raw data sources 104) by the de-identification and transformation system 102 (e.g. the data collector 112). The raw data points (e.g. data values) from each of the one or more sources (which may be de-identified separately from this process) are then standardized to a controlled vocabulary of tokens with materialized uncertainty (e.g., via the tokenizer 114). The tokens may be standardized elements that may be gleaned from each raw data disclosure or dataset format handled in isolation (e.g., ZIP code, loan amount, property age, etc.). Materialized uncertainty may include mapping each source's declared values to a set of possible values that fully cover the declared value. This may determine what facts about a loan (for example) a specific disclosed value implies on its face, without any record linkage to other loan data sources. For example, the record may specify that a property underlying a loan was built in 1982. The tokenization may "de-amplify" and standardize this information to instead specify this record as having a property built in the 1980's. This tokenization may reduce the precision of the data, but it may standardize a set of potential values which the token parameter can take on. An additional benefit of this approach, when compared to conventional mechanisms, is that the tokenization process 202 may not depend on a specific set of input records. Therefore, the dataset may be efficiently incrementally augmented as new data records arrive. Finally, because of the hashing process 204 (described further below), new tokens and hashes may be created without having to modify the existing hash set.

The de-amplified tokenization process 202 may require the creation of additional synthetic or potential records in order to accomplish the standardization. A single source record may appear more than 100 times in a set of standardized hashed records, each instance having slightly different hashed values. For example, if a ZIP code is included in raw data, a single record that previously listed a specific ZIP code may also be standardized into multiple separate records, each of which may be linked to other geographic identifiers such as a set of census tract IDs. This array or list of census tracts may cover the ZIP code in question but may also include additional areas of neighboring ZIP codes. Similarly, if the ZIP code is NULL/unavailable from the source, but property state is included in the raw data, the ZIP may be an array of 200-800 possible ZIP codes. In another example, if an original loan amount is disclosed with a rounding to the nearest $10,000, this may be normalized to a range with enumerated loan amount values. A rounded-to-ten thousand value of $ 110,000 may imply one of the 10,000 exact dollar amounts (for example, between $105,000 and $114,999). In short, one value may be converted to a new value at the same level of precision or a slight loss of precision. An example of same precision may be loan amount (rounded value, know range). An example of reduced precision may be zip code to "spatially covering" array of tracts.

The tokenizing process 202 may include a function performing a structured form of data cleaning and normalization. The raw data may contain messy source datasets with incommensurate values or encodings of the same latent concepts describing records. For example, one raw data source may specify the zip code 60010, whereas another raw data source may specify the state of Illinois. The output of the tokenizing process 202 may be one large data table per source, with a unique record ID and arrays of standardized possible token values implied by the underlying source dataset. From a privacy and license compliance perspective, tokenizing may add no information or precision to the raw dataset. Deidentified input data may result in deidentified output data.

The tokenizing process 202 may convert raw source representations of a subset of field values into a standardized enumeration of their potential meanings. In other words, the materializing of uncertainty for a source through the creation of arrays of potential standardized tokens may allow for the restatement of the given values as a set of possible values without amplifying source precision or combining it with other source information.

Raw source representations of field values may be converted into a standardized enumeration of their potential meanings. This may "materialize uncertainty" for a source—restate the given values as a set of possible values—without amplifying source precision or combining it with other source information. Materializing uncertainty may include translating identifiers.

Figure 3B:
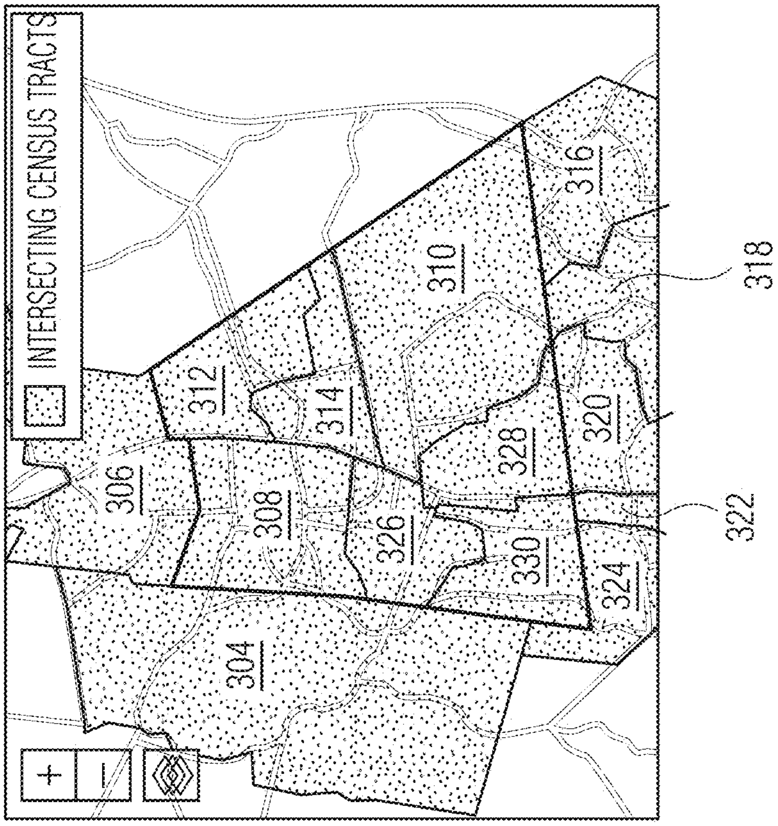
FIG. 3B is a diagram illustrating a plurality overlapping census tracks for the same location shown in FIG. 3A, according to an example of the present disclosure.
Figure 3A:
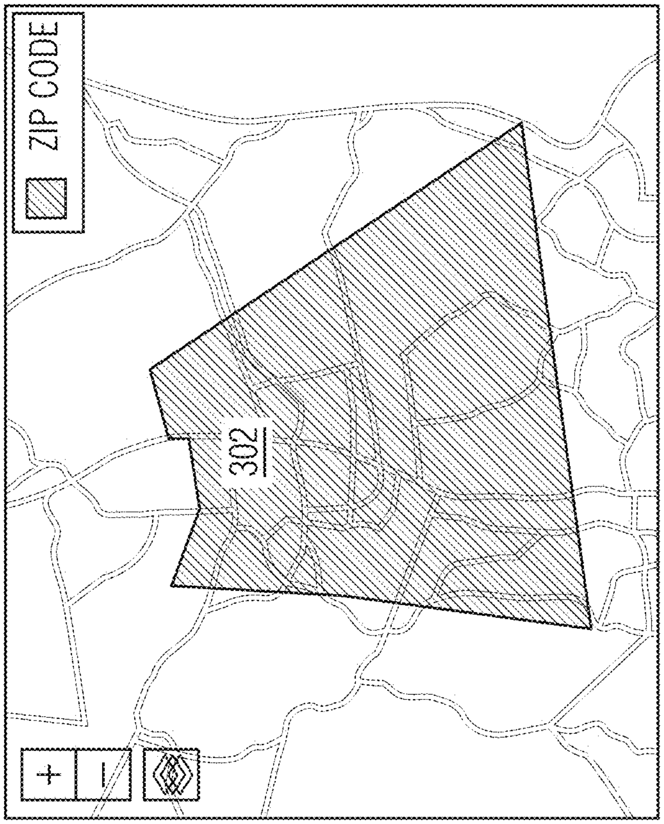
FIG. 3A is a diagram illustrating a ZIP5 code, according to an example of the present disclosure.

For example, FIG. 3A is a diagram illustrating a ZIP5 code 302 and FIG. 3B is a plurality overlapping census tracks 304-330 for the same location. Mapping the ZIP5 code 302 to the plurality overlapping census tracks 304-330 represents a coarsening of disclosed information by translating one identifier for the ZIP5 code 302 (e.g., 02176) to 14 different identifiers of the plurality overlapping census tracks 304-330.

Materializing uncertainty may also include removing anomalies. For example, for a given State USPS (AK) and a ZIP5 with no overlap (02176), one or both values may be determined to be incorrect.

Materializing uncertainty may also include defining value ranges. For example, a loan amount that is reported as $100,000 with rounding to nearest ten thousand may be restated as "lower=$95,000, upper=$104,999." An origination year that is reported as 2024 may be restated as "lower=2024 Jan. 1, upper=2024 Dec. 31."

Materializing uncertainty may also include reformatting categorical values to one or more commensurate sets by re-binning. For example, Primary Residence, Second Home, Investor status can be represented as "occupancy=['P', 'S', 'I']" or "owner_occupied=[true, false]."

Referring again to FIG. 2, the de-identification and transformation process 200 may continue with the hashing process 204 (e.g., performed via the hasher 116). The hashing process 204 may convert the standardized tokens from human-readable forms to an infinite vocabulary of hash values containing no human-readable or reverse-engineerable content. Remote token hashing may isolate the data access role from the secure hash generation role. Hashes may be one-way/irreversible. Hashed data formats may only be re-generated, which may require multi-party consent, full data access, and full salt access.

Figure 4:
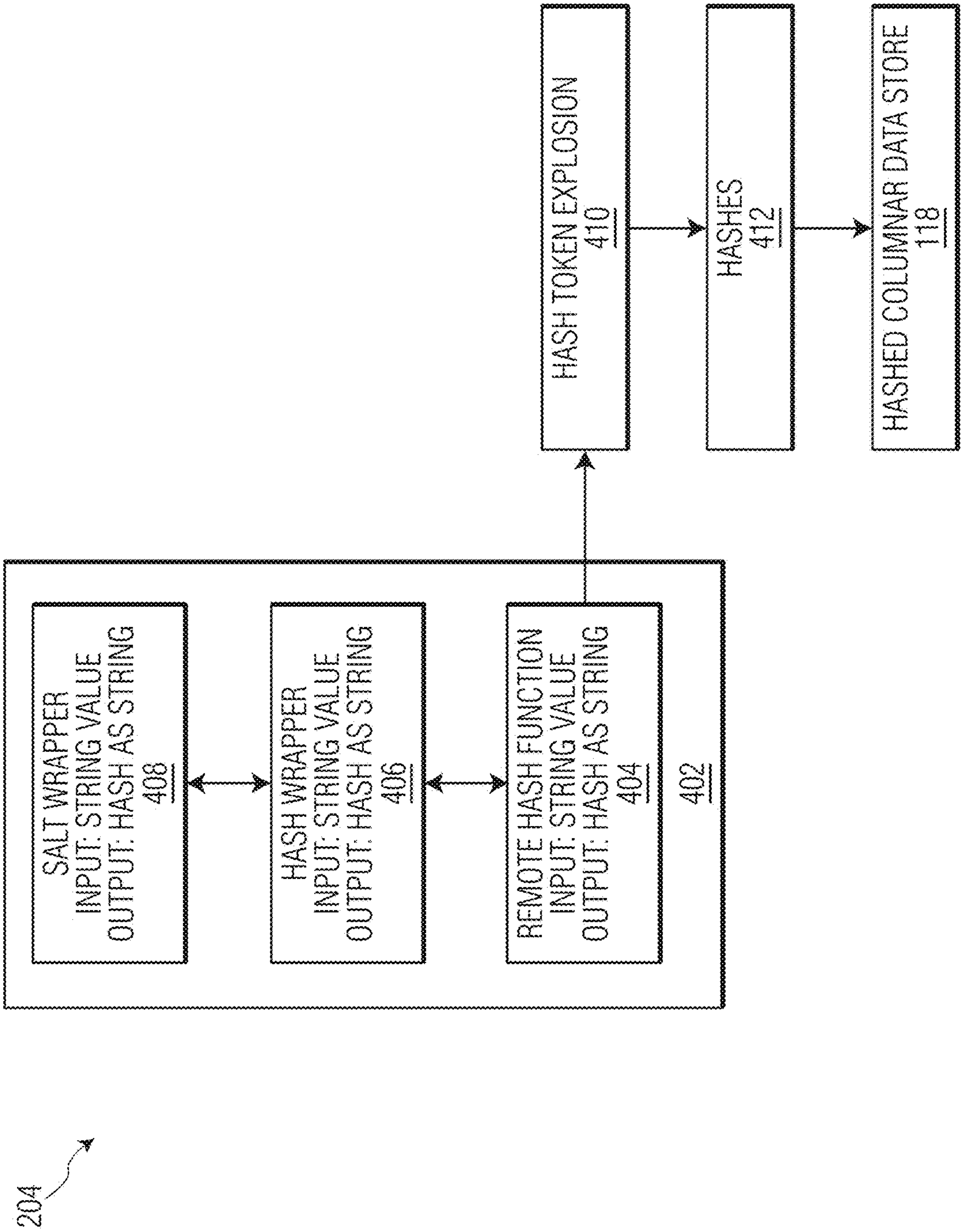
FIG. 4 is a functional diagram of a hashing process, according to an example of the present disclosure.

FIG. 4 is a functional diagram illustrating further details of the hashing process 204 that may be performed by the hasher 116. A remote token hashing process 402 may begin when a remote hash function 404 receives one or more tokens for a controlled dictionary (e.g., {"state"="MA"}) created in the tokenizing process 202. The remote hash function 404 may call a hash wrapper function 406, which may contain the logic for combining a token value with a secret value to produce a secure hash. The hash wrapper function 406 may call a salt wrapper function 408, which may embed secrets (salts) along with raw values. The salt wrapper function 408 may return a unique value for every possible input. For example, the same value in separate token columns (e.g. '{"amount"="200000"}') may be hashed with independent salts. Accordingly, unlike conventional LLMs, the salt wrapper function 408 does not require a universal secret key. This may be a differentiation from LLMs. The hash wrapper function 406 may use the unique output of salt wrapper function 408 to create a value hash and may return that value hash to the remote hash function 404. A hash token explosion process 410 may include an optional size reduction on the raw returned hash (e.g., creating an Int 64 value (8 bytes) instead of a 256-byte hash), which may reduce storage requirements when hashes 412 are persisted to a hashed columnar data store (e.g., the hashed columnar data store 118).

In an example, each value in a plaintext dataset (e.g., identifiers, text values, etc.) may be hashed this way even if they are non-sensitive. The removal of all unhashed values from a dataset may prevent backward linking from hashed to unhashed data. When controlled dictionary formats are range structure, integers, or date ranges with upper and lower bounds, the hash functions may be applied to all unique enumerations of values in that range. This may be every integer value between lower and upper, or all values between lower and upper with a step size of $X or N days, or all values floored to $N bins.

As an example, the hashed value of $101,000 may bear no similarity to the hashed value of $102,000 or $100,000. The standard token values created in the tokenizing process (in the tokenizing process 202) allows safe hashing using one-way transformations. A token like {"loan_amount":100000} may be one of perhaps 10 million observable dollar values. A token like {"loan_type": "conventional"} may be one of four observable values. In addition, token values may be wrapped in salted hash functions to expand the space of unique values in the data and further mitigate re-identification through combination risk:

hash 1({"loan_amount":100000})→ "ZGU3MGIxZWI1NzRmNGVmZTc5Yzk5MDhiNGZkNGFlMmI=", hash 2({"loan_amount":100000})→ "MTlhNzEwNTg1NGFlMWQ5Y2U4NDhiNTU0MDVkNWJjMTQ=", and so on.

In an example, hashes may be applied to every value and every identifier in the tokenized tables.

The tokenized tables (generated in the tokenizing process 202) may standardize but may not enrich the raw data. The hashing process 204 may actively destroy information. After the hashing process 204, information about a loan (e.g., its state, its year of origination, etc.) may be unrecognizable. The hashing process 204 may preserve only the unique hashes, which may have the singular use of checking for equivalence against a record value that may be passed through the same hashing process.

The output of the hashing process 204 may be a set of data tables, one per source, with irreversibly hashed record IDs and arrays of irreversibly hashed tokens. Backward linkage of hashed data to its plain-text tokenized source may be rendered impossible. The practical effect of materializing uncertainty at field level may be an uncertainty materialization from a single record (one row) to all possible combinations of unique hashed values (many rows). Denormalized tables of array columns in the hashed columnar data store 118 may be used. Unique token sets may be stored in one row using Int64 arrays, and then "re-materialized" on-demand in smaller sets for specific downstream uses.

For example, one row from a hypothetical source may contain five tokens of varying precision:

hashid_source: Base64 String
arr_hash_token 1: Array<Int 64> of length 4
arr_hash_token 2: Array<Int 64> of length 20
arr_hash_token 3: Array<Int 64> of length 6
arr_hash_token 4: Array<Int 64> of length 200
arr_hash_token 5: Array<Int 64> of length 0 (NULL)

A cross-joined combination of tokens may represent 4×20×6×200=96,000 unique record combinations for this single input row. Over datasets that may contain 100M+ input rows, this size expansion may be prohibitive both in storage costs and any future join performance.

Denormalization in the hashed columnar data store 118 may allow for the query of hashed token arrays in four ways during downstream steps. Hashes may be cross joined to all unique combinations if a specific pair of sources A, B contains one or more arr_hash_tokenN fields with sufficient precision to control the size explosion. Tests for logical array intersection (A.arr_hash_tokenN, B.arr_hash_tokenN) may have one or more elements in common with tests for degrees of array intersection (arrays have N elements in common, for Jaccard Index or Intersection-over-Union measures). Length-zero or extremely large arrays may be dropped from consideration for specific source pairs with no performance drag.

Referring again to FIG. 2, the de-identification and transformation process 200 may continue with the SynCHR process 206 (e.g., performed via the SynCHR module 120). The "SynCHR" label may be derived from the following two properties: a wider schema and many-to-may relations. The wider schema reflects a composite built from underlying hashed tokens in records from multiple sources. The many-to-many relations create a synthetic set of records that is much larger than the set of "real" underlying entities that would be described by all records. FIGS. 5A-5C and FIG. 6 illustrate aspects of the SynCHR process 206.

In the SynCHR process 206, the hashed outputs from the hashing process 204 may be joined across multiple sources. Equality-checks may be used on the hashed values to determine that a record in Source A is plausibly matchable to a record in Source B without determining the identities of either record or recovering any meaning from the hashed values. Proceeding iteratively through possible sets of sources, unique K-combinations of plausibly matchable multi-source records may be created. K-combination may refer to the "N choose K" computation for finding the list of unique unordered sets of size K that may be created from a total set of N elements. After creating the possible K-combinations of records from multiple sources, unique record groupings may be extracted. Inputs and outputs may be fully hashed. No information content about any original record may be retained. As such, the SynCHRs generated in SynCHR process 206 may be "hashed records."

As described above, source datasets may express different characteristic sets for data records (input field schemas). For example, one data record may have ZIP code and loan amount characteristics with $10,000 rounding while another data record may have state and loan amount characteristics with exact values. When sources are joined on hash equivalence for fields that overlap (e.g., loan amount), the resulting composite may carry a larger set of hashed characteristics than either record in isolation (e.g., state, ZIP code, loan amount). As such, each of the SynCHRs may represent a "composite." In addition, the multiple synthetic records created as a result of the token standardization may result in a single pair of original records resulting in multiple potential record matches in this representation.

The SynCHR process 206 (e.g., performed by the SynCHR module 120) may create composite hashed records that may be "true matches" (where the composite is made of source records that refer to the same real-world entity) or "false matches" (the composite is made of records that join on some criteria but refer to different real-world entities). It may be difficult to differentiate true matches from false matches (especially after hashing destroys plaintext information), and this process creates many more synthetic composite records than the true count of real-world entities. The resulting cohort of composite records, which may be stored in the SynCHR data store 122, may be considered synthetic (i.e., a mixed distribution of real and plausible-but-synthetic records).

In an example, SynCHRs may be constructed through iterative joins over k-combinations of sources. A k-combination may describe the possible unordered sets that result from choosing k unique sources from the total set of n source groups (often labeled "n choose k" in combinatorics). Joins over k-combinations for all k (k=2=pairs, k=3=triplets, . . . k=n for an all-to-all join) may be computed and executed.

For example, using sources A, B, C, D, E (n=5), source pairs may have a mix of token types in common and token types unique to one member.

k=2: A-B, A-C, A-D, A-E, B-C, B-D, B-E, C-D, C-E, D-E k=3: A-B-C, A-B-D, A-B-E, A-C-D, A-C-E, A-D-E, B-C-D, B-C-E, B-D-E, C-D-E k=4: A-B-C-D, A-B-C-E, A-B-D-E, A-C-D-E, B-C-D-E k=5: A-B-C-D-E

Computing all k-combinations of record matches from k=2 to k=5 may represent an iterated constraint-fitting process. Data records may have hashed tokens in common across three individual source pairs (A-B, A-C, and B-C) but may fail the more restrictive condition that records obey all the three-way constraints over the source triplet A-B-C. Restrictiveness may increase with k. K-combinations may also be explosive: 10 sources may have 1,013 unique possible pathways for k in [2,10]. Pathways may be pruned based on the degree of information overlap for pairs (k=2) and any larger k-combination that depends on a pruned pair may be dropped.

Each k-combination of sources may have a mixture of (1) hashed tokens in common, which may be used to compute record-level token overlap; and (2) hashed tokens that are specific to one source. Synthetic Composite Hashed Records may be built out of the logical intersection of hashed tokens in common and the logical union of new source-specific tokens. The result may be a wider schema (more fields containing independent hashed tokens) and more rows (resulting from many-to-many joins of input records that are plausible overlaps). The result of k-combination joins may be a collection of cross-source record-to-record mappings that obey a constraint set.

Figure 5A:
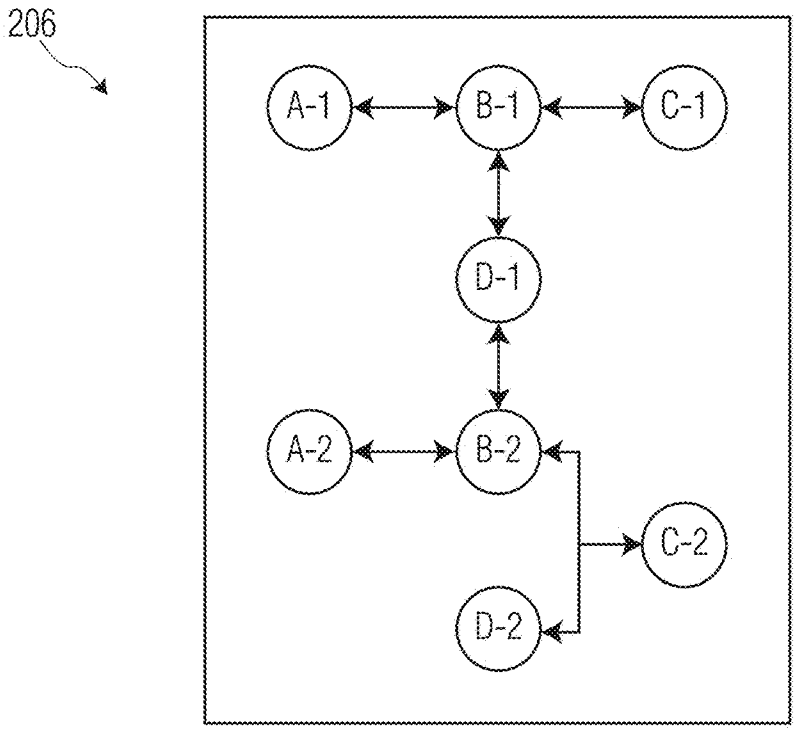
FIG. 5A is an undirected graph component with two records from a respective input source, according to an example of the present disclosure.
Figure 5B:
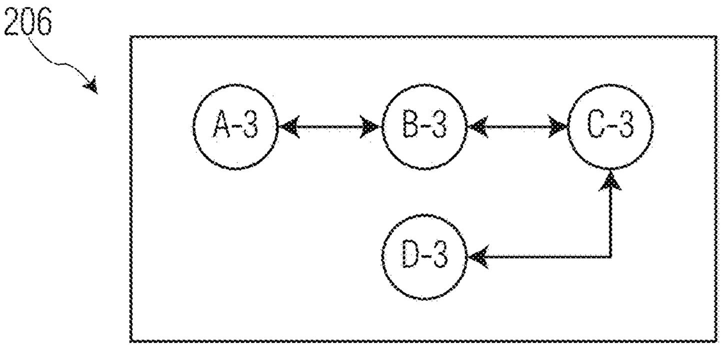
FIG. 5B is an undirected graph component with a single record from each source, according to an example of the present disclosure.
Figure 5C:
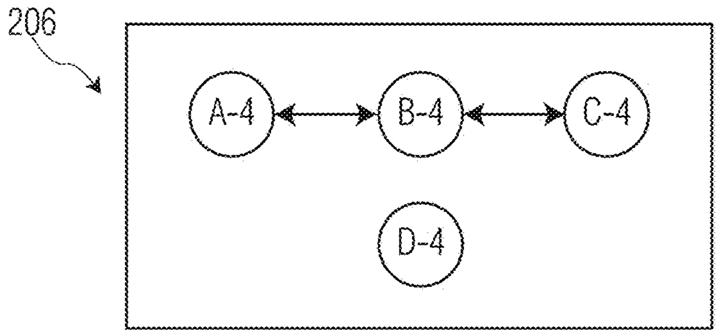
FIG. 5C is an undirected graph component showing source-records that may not be partitioned into the same graph component, according to an example of the present disclosure.

As shown in FIGS. 5A-5C, the mappings created in this aspect of the SynCHR process 206 may be interpreted as an undirected graph. Each source-record may be a node; edges are drawn between source-records satisfying the N-way constraint set. Each possible link in k-combination joins may be unified with a graph edge list of all nodes to all other joined nodes. From this edge list, connected components representing a partitioning of the graph into subsets of plausibly similar records may be extracted.

FIGS. 5A-5C are diagrams showing different examples of undirected graphs. Sources are identified in letters (A, B, C, D) and source-records with numerical suffixes (e.g., B-1, D-3). FIG. 5A shows a graph component with two records from each input source. Because it may be possible to reach any source-record from any other source-record in this undirected graph, all records in FIG. 5A may be treated as plausibly similar matches. FIG. 5B shows a graph component with a single record from each source, where certain nodes (e.g., A-3) may be indirectly linked to a single source-record from other sources. FIG. 5C shows source-records that may not be partitioned into the same graph component (e.g., because of a failed join condition in previous operations). In this case they may be represented as separate graph components.

Figure 6:
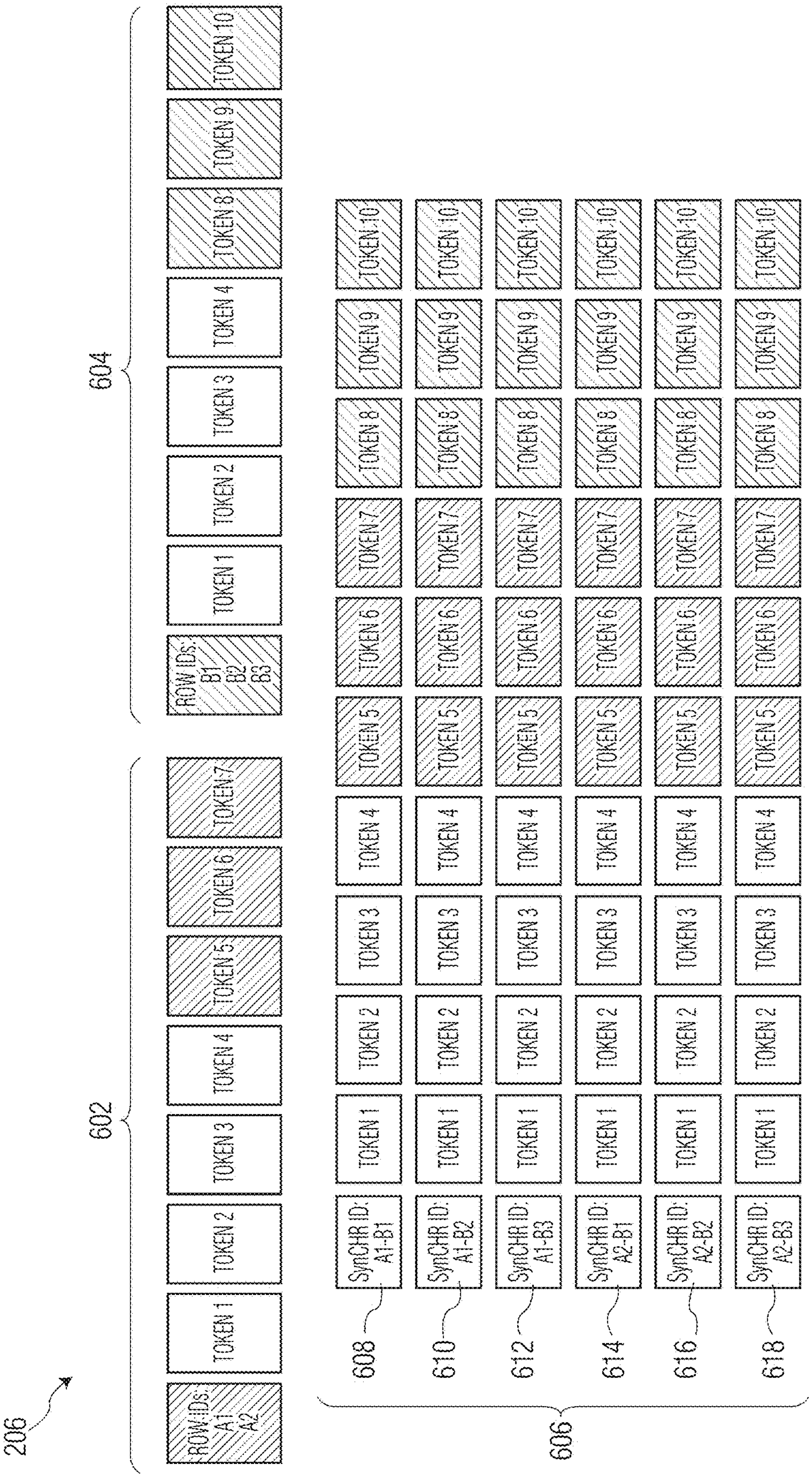
FIG. 6 is a conceptual diagram for SynCHR construction, according to an example of the present disclosure.

As shown in FIG. 6, SynCHR records may be created using the partitioned record sets from connected components in the undirected graphs (e.g., those shown in FIGS. 5A-5C). FIG. 6 is a conceptual diagram for SynCHR construction.

In an example, a first source 602 ("Source A") and a second source 604 ("Source B") may overlap on a set of hashed token fields (Token 1, Token 2, Token 3, and Token 4). The first source 602 ("Source A") may have three additional hashed tokens (Token 5, Token 6, and Token 7) that are unique to the first source 602 ("Source A"). The second source 604 ("Source B") may have three additional hashed tokens (Token 8, Token 9, and Token 10) that are unique to the second source 604 ("Source B"). The first source 602 ("Source A") may have two rows with Row IDs A1 and A2 that share the same values for Token 1, Token 2, Token 3, and Token 4. The second source 604 ("Source B") may have three rows with Row IDs B1, B2, and B3.

Joining these record groups may produce six rows of SynCHR records 606: a first SynCHR 608 with a SynCHR ID of A1-B1, a second SynCHR 610 with a SynCHR ID of A1-B2, a third SynCHR 612 with a SynCHR ID of A1-B3, a fourth SynCHR 614 with a SynCHR ID of A2-B1, a fifth SynCHR 616 with a SynCHR ID of A2-B2, and a sixth SynCHR 618 with a SynCHR ID of A2-B3. Each of these rows may have the same hashed tokens for Token 1-Token 4 (because they passed a join), but a different mixture of tokens for Token 5, Token 6, Token 7, Token 8, Token 9, and Token 10. This process may fill up a distribution of synthetic records based on hashed token combinations that have high frequencies of overlap. Resulting synthetic rows may incidentally capture a "true" match (e.g., row A1 and row B3 may link to the same real-world entity) alongside five "false" matches (e.g., if row A1 and row B3 are matches, row A1 and row B2 cannot match). The SynCHR construction may not distinguish true vs false matches.

The SynCHR data structure may be tables of hashed token arrays. This illustrates how little information may be retained in synthetic composite forms. Reducing the retained information to only what is essential for later embedding and feature aggregation may support protections for data privacy and data use rights.

Referring again to FIG. 2, the de-identification and transformation process 200 may continue with the WELSH process 208 (e.g., performed via the WELSH module 124) which may be used to convert the outputs from the SynCHR process 206 (i.e., hundreds of millions of rows in the SynCHR data store 122 containing arrays of meaningless hashes) into a latent, locally sensitive but globally hashed dataset that may be used in specific types of associative querying and analysis. The WELSH process 208 may use embedding techniques that provide improvements over conventional LLM token embedding methods and allow for the use of WELSH on securely hashed tabular data.

As described herein, embeddings may be vector representations of data. Embeddings may translate from discrete input spaces, such as a vocabulary of words/tokens, to a discrete numeric representation that is useful for downstream tasks like measuring relatedness of sentence or image pairs. Embeddings may define a meaningful data space where similar points are projected to similar places. The embedding space described herein may be a discrete space of hashed values where similarity is defined based on a hierarchical membership model of the hashed values, rather than on raw proximity. In this way, it may allow for the creation of a discrete similarity score, but crucially, it is NOT additive. However, because the embedding space is not additive, the relative locations of two records in the embedding space may not be informative unless their values have some correspondence in these hierarchies. Unlike normal embeddings, the embedding hashes are not informative on their own. Embeddings may be structured as fixed-length arrays of numbers.

For example, typical LLMs may use a pre-specified and fixed size vocabulary of common tokens (e.g., 100 k tokens) and then employ a matrix of weights to convert the sequence of tokens in raw text into an embedding array.

Other approaches like the HashFormers model may use various hashing techniques to allow arbitrary-size vocabularies while keeping a capped size on their embedding matrices to enable infinite vocabularies with limited memory use. However, the HashFormers model is limited in key ways. For example, HashFormers pre-training procedures rely on a classification objective (Shuffle+Random) that predicts whether hashed tokens in a sequence have been shuffled, randomly replaced, or left intact. This procedure works for the HashFormers LLM, where token ordering is meaningful (language data), and the structure of token sequence relationships is preserved by hashing all tokens with a single universal salt. However, these requirements (i.e., hashing with a universal salt and preservation of meaning in token sequences post-hashing) are not workable for securely hashed tabular data. HashFormers compresses semantic meaning but preserves it through a single salt.

The WELSH process 208 may solve these limitations by using a model-free embedding that uses on-the-fly hashes of "woven" token sets representing an infinite potential vocabulary. The WELSH process 208 may conclusively destroy record content with remote token hashing to guarantee license/privacy compliance. Using WELSH may allow for the retention of enough information to determine that Target Record A and SynCHR B are similar and measure that similarity in units meaningful for any potential Target/SynCHR comparison. WELSH may allow for the scaling of similarity measurements and comparisons over billions of pairwise Target/SynCHR possibilities and enable rapid search and extraction of a fixed-K nearest-neighboring SynCHRs for each target.

Combinations of hashed token sets may be treated as an "infinite vocabulary." New hash functions may be layered onto the vocabulary to reduce it from infinite to discrete fixed-size chunks. A first-order embedding may be produced by encoding fixed-size chunks into a numeric array representing an arbitrary data space. Optionally, embeddings may be fine-tuned or further compressed in dimensionality using neural networks, (e.g., trained with a range of contrastive learning, semi-supervised, or unsupervised approaches). Vector indexes may be built on the final embeddings for fast querying and lookup.

Equivalent methods to locality sensitive hashing, clustering, or other vector indexing strategies may be used for information retrieval. Input information may be converted to a vector of values with the WELSH method, which may be reduced or clustered into formats that make lookups far more efficient than checking each query record against each stored record in a database. This technique may be used for the conversion of the infinite vocabulary of hashes to a numeric form suitable for search tree structures and the computation of similarity metrics. These tree structures may be structured similarly to the hierarchy of the embedding encoding function such that spurious results do not occur around edge cases.

For each row in the SynCHR data store 122, hashes may be "woven" together and re-hashed using a FarmHash function. The weaving operation may combine hashed tokens from multiple fields in a SynCHR record into a new hash value. The FarmHash function may map inputs to an approximately uniform distribution of 64-bit integers. For example, this may look like: FARMHASH ({"loan_amount":"Tl . . . jMTQ=", "zip_code" "ODIyM . . . gzM2M=", "building_age" "NWY0Z . . . NmOTk="})→ 4066415779383691289. Over hundreds of unique weavings of SynCHR fields, each row may be converted from a hash representation to an integer representation, and then from integers to a numeric representation on the interval [0,1]. The value 0.5 may be reserved for cases where any of the constituent weavings contained an input value of NULL.

Figure 7:
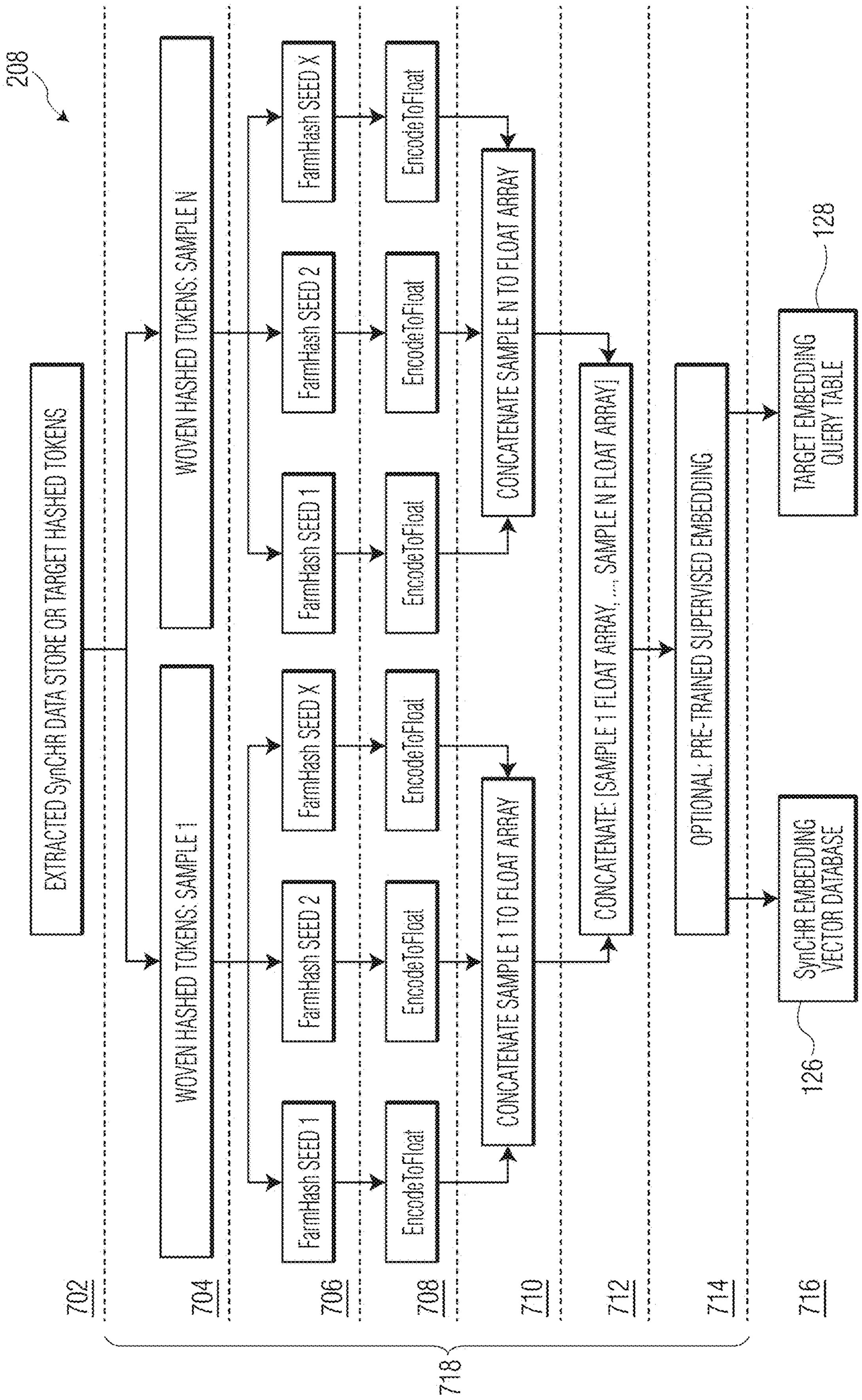
FIG. 7 is a flowchart illustrating a woven encrypted locality-sensitive hashing ("WELSH") process, according to an example of the present disclosure.

FIG. 7 is a flowchart illustrating further details of the WELSH process 208 that may be performed by WELSH module 124. The WELSH process 208 may be applied the same way to SynCHRs and targets (same samples, same seeds) to yield comparable outputs.

At step 702, SynCHRs and hashed tokens may be extracted from one of the SynCHR data store 122 and the hashed columnar data store 118.

At step 704, combinations of the SynCHRs and hashed tokens may be repeatedly sampled into a plurality of samples. A concatenated string of unique cross-joined hash combinations may be computed from 3-5 (for example) arrays of hashed tokens and the output may be an MD5 hash (concatenated string) sample to create the plurality of samples.

At step 706, each sample of the plurality of samples may be re-hashed to a Int64 value with multiple seeds to create a plurality of Int64 values. A FarmHash may be computed for each sample and the output may be a uniform Int64 value to create the plurality of Int64 values.

At step 708, each Int64 value may be encoded to a float value to create a plurality of float values.

At step 710, each float value of the plurality of float values may be concatenated to a float array. The input may be one float value per FarmHash seed and the output may be a float array for each sample.

At step 712, the float arrays for each sample may be concatenated to a single large float array (i.e., WELSH embedding). For example, 16 FarmHash seeds for 16 samples may create a length-256 array output.

At step 714, an optional step of pre-trained supervised embedding may be performed. A semi-supervised embedding, for instance using triplet loss or contrastive learning, may boost performance by refining raw WELSH embeddings in the presence of heavy data noise or missing values. Steps 704-714 may be referred to collectively as a WELSH embedding process 718.

At step 716, the WELSH embedding may be output to one or more of the SynCHR embedding vector database 126 and the target embedding query table 128. In an example, the WELSH embedding may be an array of floating point numbers, each element on the interval [0,1], constructed from a very high-dimensional space using the infinite vocabulary of hashed tokens. This representation may have equivalent structure and function to embeddings used in machine learning language models: a mapping from a discrete input space of tokens to a numeric representation defining a metric space where similarity between points can be measured efficiently. However, unlike the language model example, the WELSH process 208 may be model-free; and it may be built through repeated deterministic hashing operations with optional models for fine-tuning or compressing the resulting embeddings. In addition, WELSH embeddings performed by WELSH module 124 may employ upstream salted hashing for the secure destruction of information that may cause data-rights issues in composite formats.

A problem with processing real-world data (e.g., loan datasets) is that they may be high-dimensional and over enough dimensions any data point becomes unique. The projection space may not matter for measuring uniqueness and proximity. The requirements may be sensitive only to similarity of points, not the identity of points. The WELSH process 208 therefore may allow for similarity determination not identification.

Turning sampled columns into embedding elements with EncodeFloat may amount to the re-projection of an infinite range of discrete values (hash tokens) into a new continuous data space. This new space may be a form of an embedding.

The WELSH process 208 may be a model-free embedding approach and may be extremely scalable. Because a fixed embedding matrix is avoided in favor of hashes, WELSH calculations may be deployed directly inside one or more of the SynCHR data store 122 and the SynCHR feature database 138 for distributed computation.

The WELSH embeddings generated by the WELSH process 208 may be useful in downstream product creation. Distance measures like cosine similarities for target/SynCHR pairs may be good measures of proximity. The model-free output of the WELSH process 208 may be rich enough for fine-grained differentiation among candidate pairs.

Figure 8:
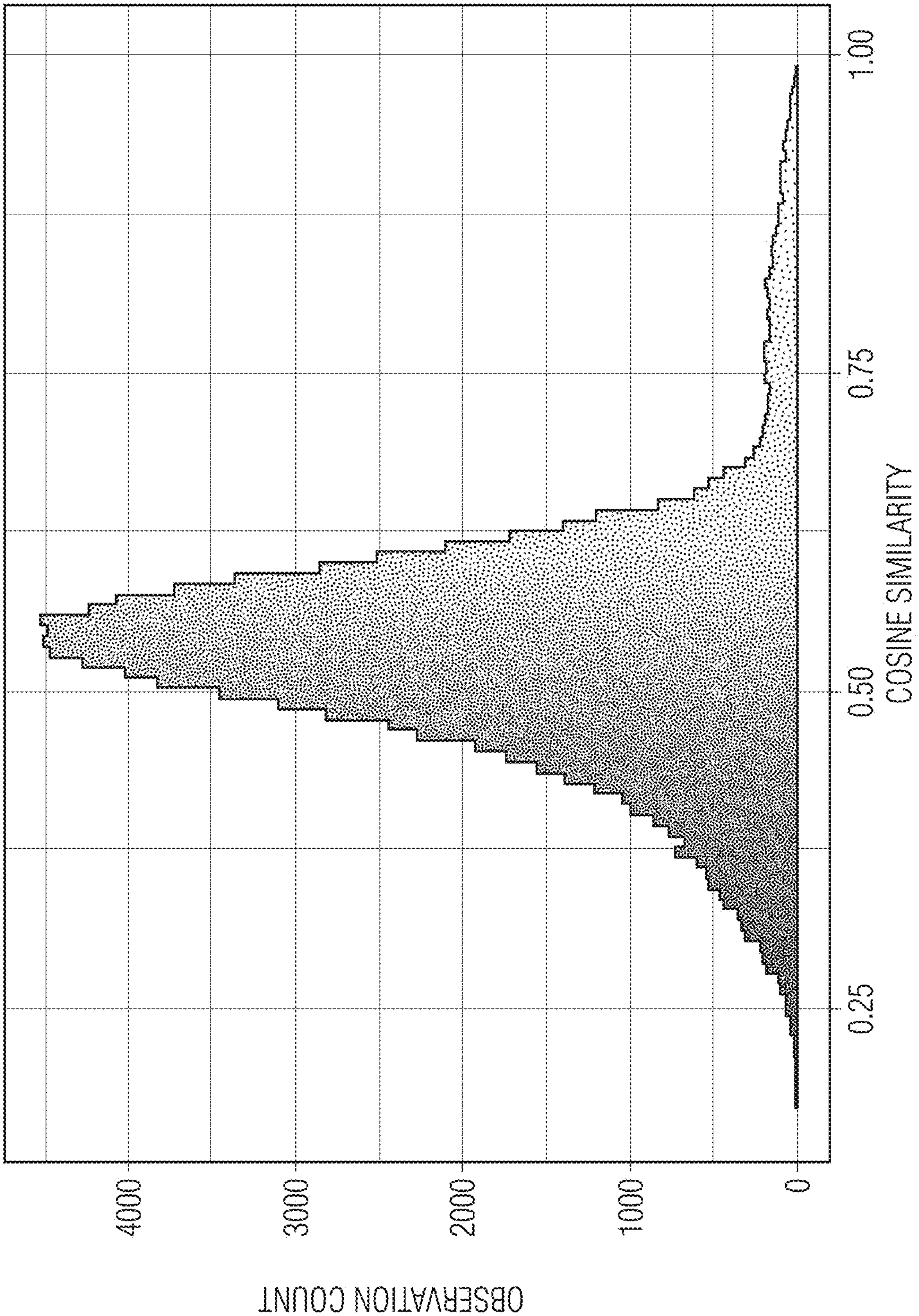
FIG. 8 is a chart illustrating cosine similarity, according to an example of the present disclosure.

FIG. 8 is a chart illustrating cosine similarity. More specifically, FIG. 8 shows a distribution of cosine similarities between sampled target records and sampled SynCHRs. The x-axis is cosine similarity, and the y-axis is observation count. Similarities may be computed on pure WELSH embeddings with no fine-tuning. A high similarity (near 1.0) may imply that point pairs are closer in the embedding space. This distribution shape may be ideal for product aggregations. Very few point pairs are high similarity (>0.9). Nearby neighbors are meaningfully distinct from everything else. Most point pairs are 0.3-0.7, which may be interpreted as low similarity (far away) in many random directions in the data space WELSH defined. No point pairs fall below 0.1, which may be interpreted as a strongly inverse-correlated relationship between points in a pair.

For applications with noisy input data (e.g., heavy error/missingness) or product layers that involve supervised modeling, WELSH embeddings may be fine-tuned with many neural network architectures (e.g., triplet loss and contrastive learning approaches in unsupervised and semi-supervised model workflows). Models may be introduced downstream of WELSH for directed refinement of raw embeddings or dimensionality reduction to compress WELSH arrays into smaller sizes to reduce storage cost and lookup times in neighbor search.

Referring again to FIG. 2, the de-identification and transformation process 200 may continue with the indexed vector search extraction process 210 (e.g., performed by the extractor 130), in which local or cohort level values may be extracted through an indexed vector search to identify records in one or more of the SynCHR embedding vector database 126 and the target embedding query table 128 having WELSH similarity. Ultimately, this may allow for the characterization of a collection of original records. For example, a pool of mortgage loans with valuable data such as prepayment projections informed by loan lifecycle events (e.g., a new rate-lock), an up-to-date home value estimate (e.g., from automated valuation models), climate risk measures, or any other descriptive characteristic of a loan or its collateral property that may be useful in predicting its future behavior or financial valuation without at any stage linking or combining information that is relevant to the identification of any of the constituent raw data sources may be pooled together.

SynCHRs with associated label data stored in the SynCHR data store 122 may be used to characterize real loans in financial assets (e.g., securitized mortgage loan disclosures). These raw data records may be real records published by a sensitive data provider. After tokenizing, hashing, and constructing WELSH embeddings on real records, the resulting vector values (e.g., stored in one or more of the SynCHR embedding vector database 126 and the target embedding query table 128) may serve as query points for looking up the nearest K neighboring SynCHR points in the hashed vector space.

Tangibly, this may yield a data structure in the loan example like: [real_loan_id, synchr_1_id, synchr_1_cosinesim, . . . synchr_K_id, synchr_K_cosinesim], which may be the real loan, a set of neighbors of chosen size, and the cosine similarity between real_loan_id and each synchr_id.

This data structure of real_loan_id to K nearest synchr_id may be tied to any non-sensitive feature values mappable to a synchr_id (e.g., climate risk, prepayment estimates, etc.) and mapped forward to real_loan_id, with some aggregation to a single value using each neighbor's cosine similarity as a convenient weight.

Revisiting the space partitioning framework to describe statistical and maximum likelihood (ML) models, the final retrieval of K nearest neighbor SynCHR points for each real data record (e.g. a loan), and further aggregation of label data, such as a prepayment or climate risk estimate to characterize the real loan, may keep the use of disclosure datasets equivalent to any other model of loan behavior. Loan-level risk estimates may be aggregated (e.g., product of K SynCHR records) and derived products may be further aggregated to a batch, pool, or cohort level.

Figure 9:
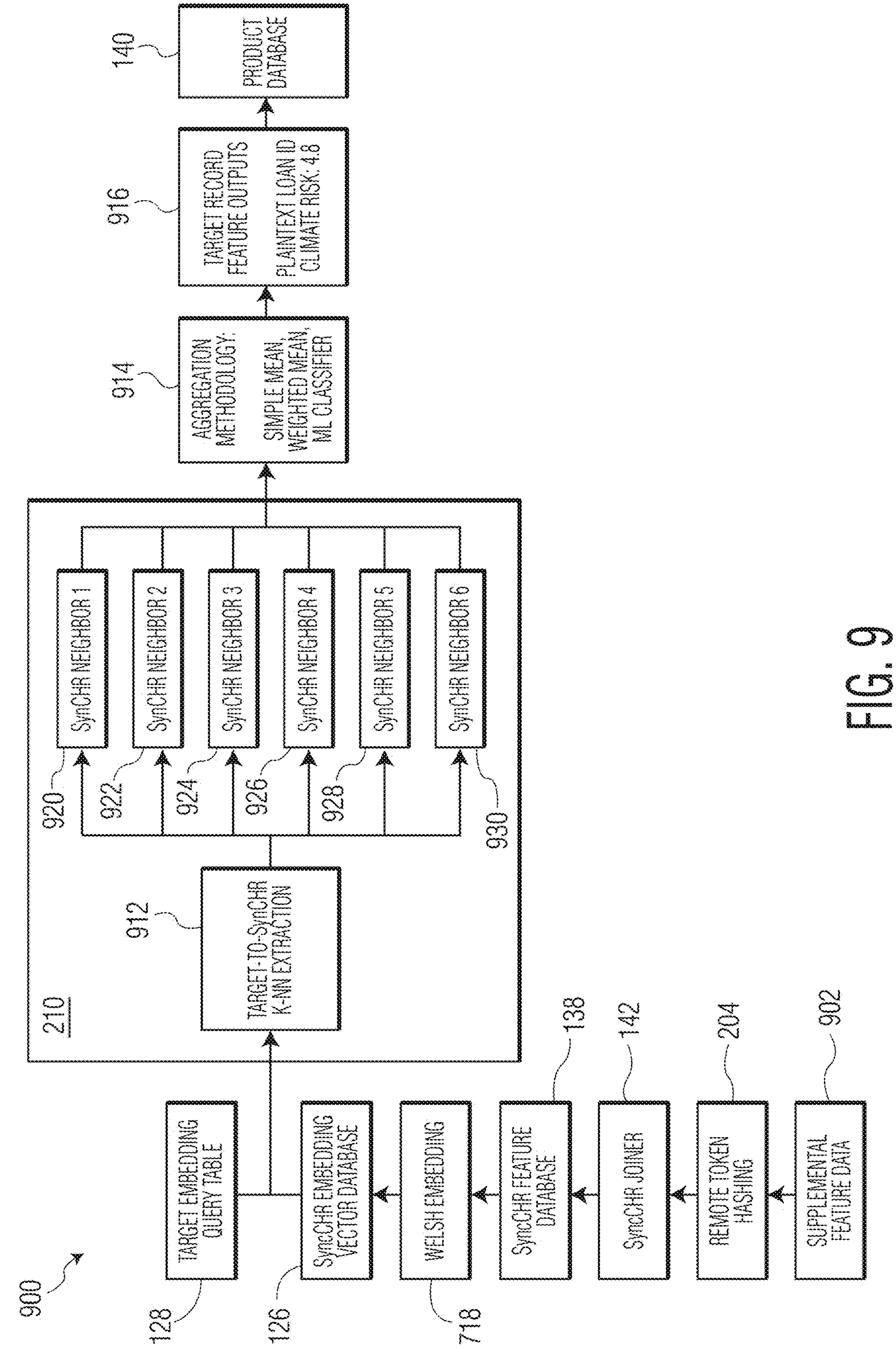
FIG. 9 is a flowchart illustrating a target record feature aggregation process, according to an example of the present disclosure.

FIG. 9 is a flowchart illustrating details of an example target record feature aggregation process 900 that may be performed via the extractor 130. The target record feature aggregation process 900 may utilize the indexed vector process 210 to extract useful products from the SynCHR feature database 138 and one or more of the SynCHR embedding vector database 126 and the target embedding query table 128.

A "feature" (some information from a supplemental dataset) may be associated to target records without linking datasets in a manner that may reidentify or enable backward linking of their constituent records. It is understood that the feature data described with respect to FIG. 9 represents a nonlimiting example, and that the example target record feature aggregation process 900 may be performed for any suitable desired feature data.

The target record feature aggregation process 900 may begin by identifying supplemental feature data 902. The supplemental feature data may be, for example, climate risk data and may have an associated plaintext property ID, which may be used as a join key.

The hashing process 204 may be performed to transform the plaintext property ID of the supplemental feature data 902 to a property ID hash. The SynCHR joiner 142 may associate the property ID hash with one or more SynCHRs, such that the one or more SynCHRs represent the climate risk data. The one or more SynCHRs that represent the climate risk data may be stored in the SynCHR feature database 138 where the SynCHR ID may be used as a join key.

The WELSH process 718 may be performed on the one or more SynCHRs stored in the SynCHR feature database to generate WELSH embeddings, which may be stored the SynCHR embedding vector database 126.

The indexed vector search extraction process 210 may be performed by querying the target vector embedding query table 128 to retrieve a target record. The target record may include (in a non-limiting example) a plaintext loan ID, which may be used as a join key. The indexed vector search extraction process 210 may include a target record to SynCHR K nearest neighbor extraction process 912. Nearest neighbors from the target record to SynCHRs may be calculated via cosine similarity on the WELSH embedding vectors in the SynCHR embedding vector database 126 and the target vector embedding query table 128. The target record to SynCHR K nearest neighbor extraction process 912 may identify one or more SynCHR neighbors (e.g., neighbors 920-930). For example, a first SynCHR neighbor 920 ("SynCHR Neighbor 1") may have a cosine similarity of 0.98 and a climate risk of 5, a second SynCHR neighbor 922 ("SynCHR Neighbor 2") may have a cosine similarity of 0.93 and a climate risk of 3, a third SynCHR neighbor 924 ("SynCHR Neighbor 3") may have a cosine similarity of 0.92 and a climate risk of 1, a fourth SynCHR neighbor 926 ("SynCHR Neighbor 4") may have a cosine similarity of 0.91 and a climate risk of 1, a fifth SynCHR neighbor 928 ("SynCHR Neighbor 5") may have a cosine similarity of 0.90 and a climate risk of 1, and a sixth SynCHR neighbor 930 ("SynCHR Neighbor 6") may have a cosine similarity of 0.84 and a climate risk of 0.

An aggregation process 914 may be performed on the multiple underlying SynCHR records. The aggregation process may be done without associating sensitive identifiers to the target record inside the process, and the result may be an aggregation of features from the multiple SynCHRs. No part of the process is reversible to reveal sensitive information. The aggregation process may be one or more of a simple average, cosine-similarity-weighted average, or more complex approaches like statistical or ML models. Feature values attached to the K-neighbor SynCHRs may be accurately blended without enabling back-linking or decompilation to any input data.

A target record ID 916 may be generated. The target record ID 916 may be a loan with a feature appended to it (e.g., a climate risk score). The target record ID 916 may include, for example, the plaintext loan ID and the aggregated climate risk score. In an example, the target record ID may be stored in the product database 140.

Figure 10A:
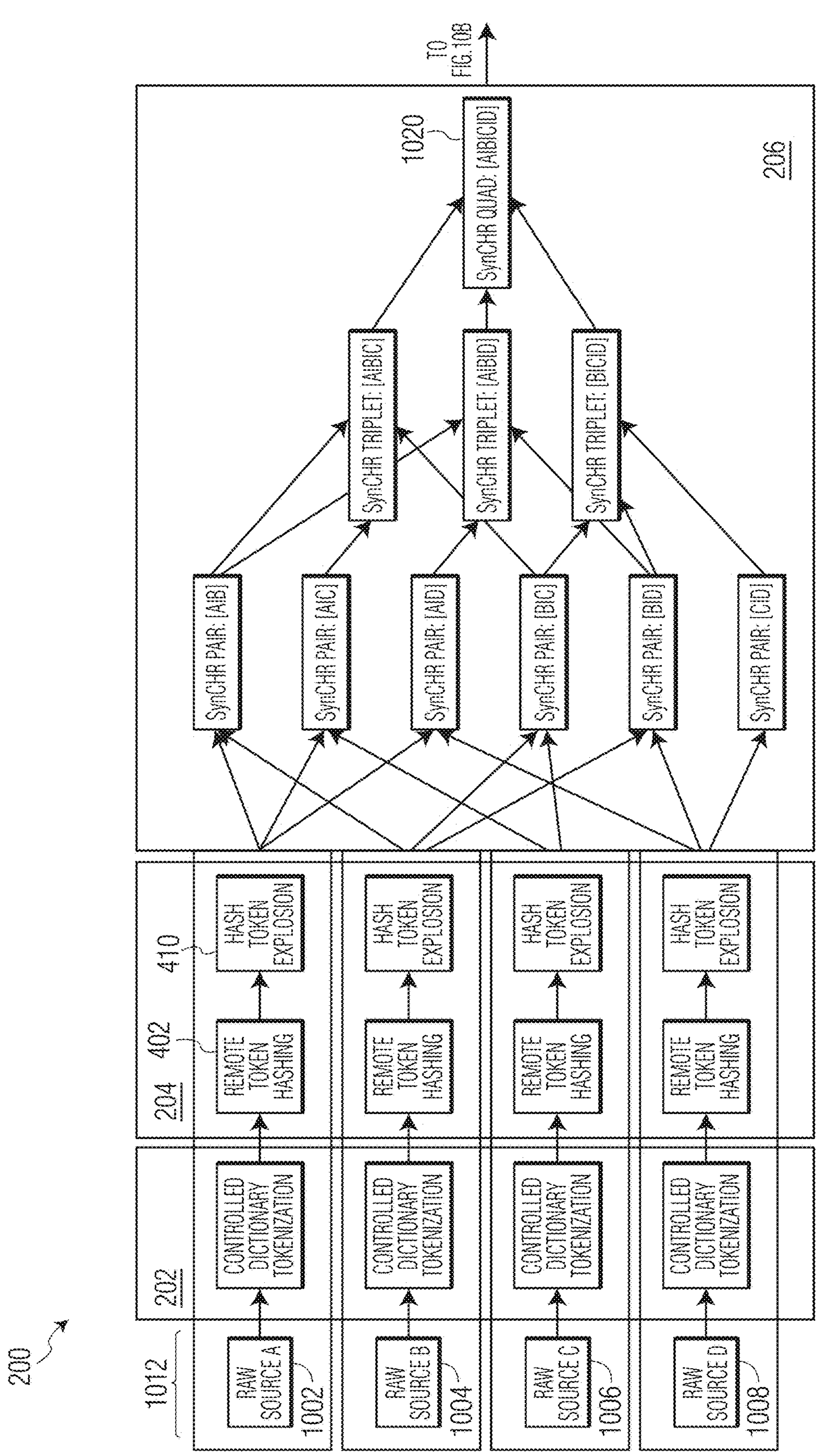
FIGS. 10A-10B are a functional diagram illustrating an association of a feature with a target record using a de-identification and transformation process, according to an example of the present disclosure.
Figure 10B:
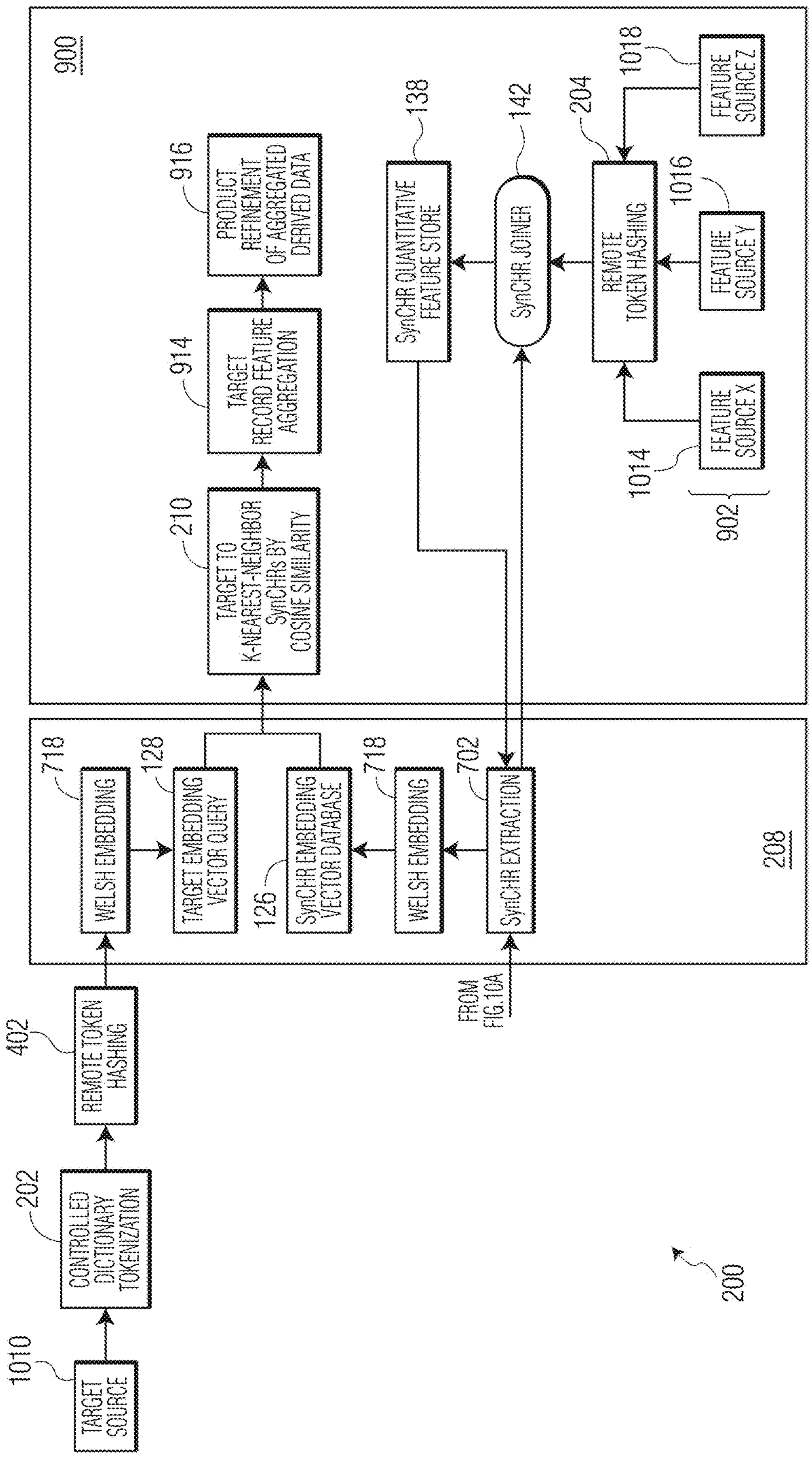

FIGS. 10A-10B are a functional diagram illustrating an example association of a feature with a target record using the de-identification and transformation process 200. One or more raw sources 1012 (e.g., a first raw source 1002 ("Raw Source A"), a second raw source 1004 ("Raw Source B"), a third raw source 1006 ("Raw Source C"), and a fourth raw source 1008 ("Raw Source D")) may be standardized to a controlled vocabulary of standardized tokens with materialized uncertainty via the tokenizing process 202. Similarly, a target source 1010 may undergo the tokenizing process 202 to create target standardized tokens.

The raw standardized tokens may be converted from human-readable forms to an infinite vocabulary of hash values containing no human-readable or reverse-engineerable content via the hashing process 204. As described above, the hashing process 204 (for the one or more raw sources 1012) may include the remote token hashing process 402 and the hash token explosion process 410. The target standardized tokens (for target source 1010) may also undergo the remote token hashing process 402.

The hashed outputs from the hashing process 204 (for the one or more raw sources 1012) may be joined across multiple sources via the SynCHR process 206 to create SynCHR records 1020 that may be stored in the SynCHR data store 122.

The WELSH process 208 may be used to convert the SynCHR records 1020 created by the SynCHR process 206 and the hashed targets 402 into a latent, locally sensitive but globally hashed dataset that may be used in specific types of associative querying and analysis. In an example, the SynCHR records 1020 may be extracted (step 702) from the SynCHR data store 122. The WELSH embedding process 718 may be performed on both the SynCHRs records 1020 and hashes (from hashed targets 402) generated from the target source 1010 in the same manner (e.g., same samples and same seeds) to yield comparable outputs. The WELSH embeddings generated by performing the WELSH process 718 on the SynCHRs records 1020 may be output to the SynCHR embedding vector database 126 and the WELSH embedding generated by performing the WELSH process 718 on the hashed targets 402 generated from the target source 1010 may be output to the target embedding query table 128.

The target record feature aggregation process 900 may be used to extract products from one or more of the SynCHR embedding vector database 126 and the target embedding query table 128 and associate features to target records without linking datasets in a manner that may reidentify or enable backward linking of their constituent records.

Feature data 902 from one or more feature sources (e.g., a first feature source 1014, a second feature source 1016, and a third feature source 1018) may be identified and undergo the hashing process 204 to form a feature hash. The SynCHR joiner 142 may associate the feature hash with one or more SynCHRs extracted (step 702) from the SynCHR data store 122. The one or more SynCHRs that have been associated with the feature hash may be stored in the SynCHR feature database 138.

The indexed vector search extraction process 210 may be performed by querying the target vector embedding query table 128 and the SynCHR embedding vector database 126. Nearest neighbors from the target record to SynCHRs may be calculated via cosine similarity or an equivalent method on the WELSH embeddings stored in the SynCHR embedding vector database 126 and target embedding query table 128.

The aggregation process 914 may be performed on the SynCHRs identified as K nearest neighbors, which may include the SynCHRs that have been associated with the feature hash, and the target record ID 916 may be generated.

The de-identification and transformation process 200 may provide a number of advantages over conventional de-identification processes. For example, it may allow for rigorous standards for compliance with data licenses and rights restrictions in loans, especially related to reidentification of borrowers or business partners. Hashing information such that even internal users can glean no sensitive information is a strong protection.

For example, the de-identification and transformation process 200 may be particularly useful for loan lifecycle event integration in prepayment models. In existing methods for data de-identification, values associated to individuals or properties (e.g., an address) must be redacted from disclosures. In most cases, data linkages that associate an undisclosed address would be prohibited. This would bar certain prepayment modeling strategies, which may incorporate high-confidence loan lifecycle events (e.g., sales listings, new rate locks, loan closings, deed recordings, etc.).

However, the de-identification and transformation process 200 method enables prepayment modeling strategies. The de-identification and transformation process 200 may isolate feature data (e.g., event streams to improve prepayment model accuracy) from unhashed entity identifiers or characteristics (e.g., loan or property information) which might enable an internal or external data user to reidentify the underlying entities. Loan lifecycle events may be associated to hashed entities and SynCHRs and may be further transformed to derived quantities (e.g., probabilities, survival curves, sequence embeddings, etc.) appropriate for modeling. Derived values may be associated to Target Record IDs through the novel methods described herein and further aggregated to quantities of interest such as a prepayment vector.

In another example, the de-identification and transformation process 200 may be useful for geospatial climate risk estimation and home valuations. The association of a property address to anonymized records is typically prohibited. For applications like climate risk estimation or home valuation models, traditional methods of analysis like spatially aggregated MSA- or state-level values mask high property-level variance. Accuracy and precision of estimates suffer as the degree of aggregation increases. By isolating the geospatial feature data (e.g., modeled flood depths, modeled home values, etc.) through the proposed methodology, internal and external users may produce and receive accurate data without gaining any knowledge of underlying loan or property entities.

As described herein, algorithmic descriptions and representations are used to convey the substance of this disclosure effectively to others skilled in the art. These operations, while described functionally, computationally, or logically, are to be understood as being implemented by data structures, computer programs or equivalent electrical circuits, field programmable gate arrays (FPGAs), microcode, or the like. Furthermore, at times, it may be convenient to refer to these arrangements of operations as routines or algorithms. The described operations and their routines/algorithms may be embodied in specialized software, firmware, specially configured hardware or any combinations thereof.

The methods described herein may be performed by processing logic that may comprise hardware (e.g., circuitry, dedicated logic, programmable logic, microcode, etc.), software (such as instructions run on a processing device), or a combination thereof. In one embodiment, the methods described herein may be performed by one or more specialized processing components.

Systems and methods of the present disclosure may include and/or may be implemented by the de-identification and transformation system, which may include one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic information/transaction system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the de-identification and transformation system and that causes the de-identification and transformation system to perform any one or more of the methodologies of the present disclosure.

Figure 11:
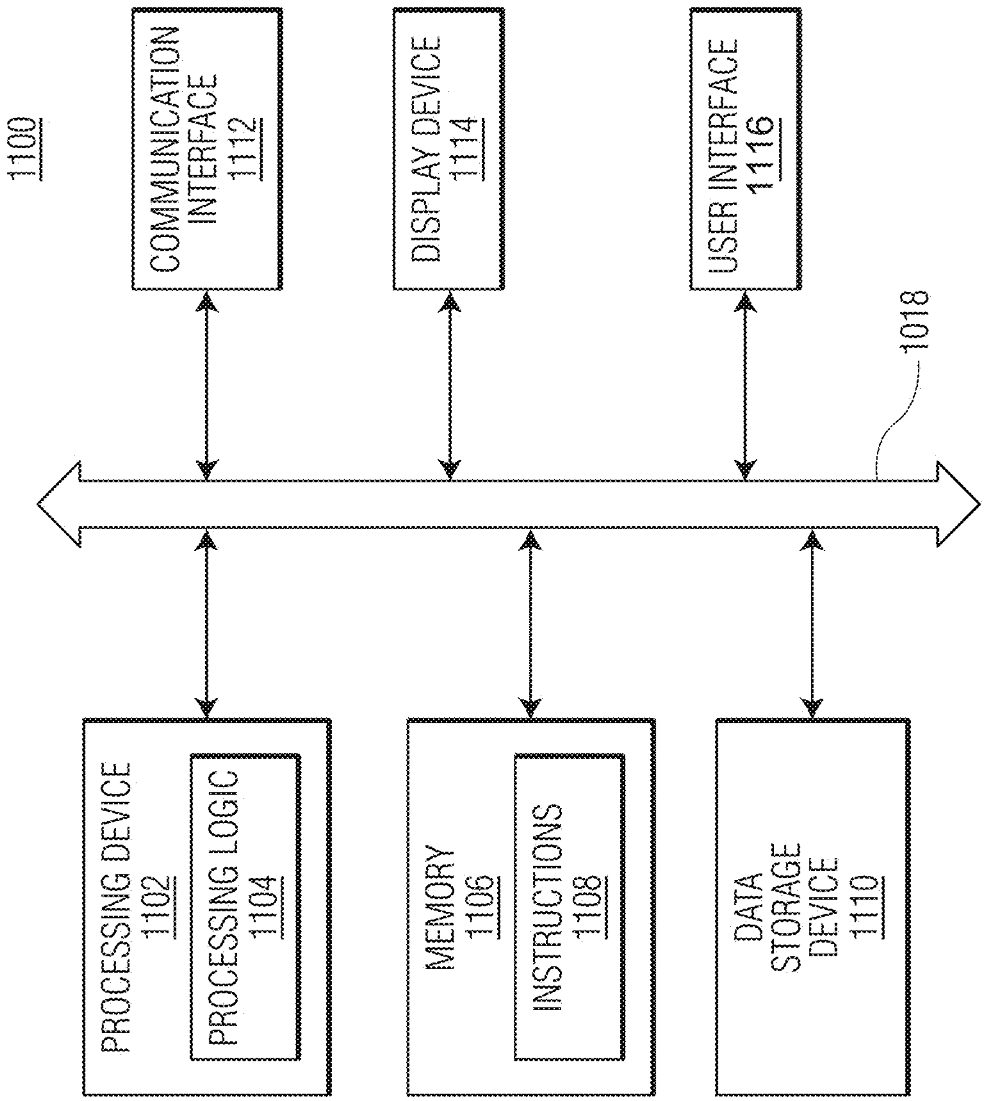
FIG. 11 is a functional block diagram of a de-identification and transformation system in the example form of computer system, according to an example of the present disclosure.

Referring now to FIG. 11, a functional block diagram of the de-identification and transformation system in the example form of computer system 1100 within which a set of instructions for causing the de-identification and transformation system to perform any one or more of the methodologies, processes or functions discussed herein may be executed. In some examples, the de-identification and transformation system may be connected (e.g., networked) to other machines as described above. The de-identification and transformation system may operate in the capacity of a server or a client machine in a client-server network environment, or as a peer machine in a peer-to-peer (or distributed) network environment. The de-identification and transformation system may be any special-purpose machine capable of executing a set of instructions (sequential or otherwise) that specify actions to be taken by that machine for performing the functions describe herein. Further, while only a single de-identification and transformation system is illustrated, the term "de-identification and transformation system" shall also be taken to include any collection of machines that individually or jointly execute a set (or multiple sets) of instructions to perform any one or more of the methodologies discussed herein. In some examples, DIDT system 102 (FIG. 1) may be implemented by the example machine shown in FIG. 11 (or a combination of two or more of such machines).

The example computer system 1100 may include processing device 1102, memory 1106, data storage device 1110 and communication interface 1112, which may communicate with each other via data and control bus 1118. In some examples, computer system 1100 may also include display device 1114 and/or user interface 1116.

Display device 1114 may be any known display technology, including but not limited to display devices using Liquid Crystal Display (LCD) or Light Emitting Diode (LED) technology.

The processing device 1102 may use any known processor technology, including but not limited to graphics processors and multi-core processors. The processing device 1102 may include, without being limited to, a microprocessor, a central processing unit, an application-specific integrated circuit (ASIC), a field programmable gate array (FPGA), a digital signal processor (DSP) and/or a network processor. The processing device 1102 may be configured to execute processing logic 1104 for performing the operations described herein. The processing device 1102 may include a special-purpose processing device specially programmed with processing logic 1104 to perform the operations described herein. The processing device 1102 may be operatively coupled to the memory 1106.

The memory 1106 may include, for example, without being limited to, at least one of a read-only memory (ROM), a random-access memory (RAM), a flash memory, a dynamic RAM (DRAM) and a static RAM (SRAM), storing computer-readable instructions 1108 executable by processing device 1102. The memory 1106 may include a non-transitory computer readable storage medium storing computer-readable instructions 1108 executable by processing device 1102 for performing the operations described herein. Although one memory 1106 is illustrated in FIG. 11, in some examples, computer system 1100 may include two or more memory devices (e.g., dynamic memory and static memory).

The user interface 1116 may be any known input device technology, including but not limited to a keyboard (including a virtual keyboard), mouse, track ball, camera, and touch-sensitive pad or display.

The data and control bus 1118 may be any known internal or external bus technology, including but not limited to industry standard architecture (ISA), extended ISA (EISA), peripheral component interconnect (PCI), PCI Express, universal serial bus (USB), Serial advanced technology attachment (ATA) or FireWire.

The computer system 1100 may include communication interface 1112, for direct communication with other computers (including wired and/or wireless communication) and/or for communication with a network. In some examples, computer system 1100 may include display device 1114 (e.g., a liquid crystal display (LCD), a touch sensitive display, etc.).

In some examples, the computer system 1100 may include data storage device 1110 storing instructions (e.g., software) for performing any one or more of the functions described herein. Data storage device 1110 may include a non-transitory computer-readable storage medium, including, without being limited to, solid-state memories, optical media and magnetic media.

One or more features or steps of the disclosed embodiments may be implemented using an application programming interface (API). An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

The methods described herein, including those with reference to one or more flowcharts, may be performed by a controller and/or processing device (e.g., smartphone, computer, etc.). The methods may include one or more operations, functions, or actions as illustrated in one or more of blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation. Dashed lines may represent optional and/or alternative steps.

Additional examples of the presently described method and device embodiments are suggested according to the structures and techniques described herein. Other non-limiting examples may be configured to operate separately or may be combined in any permutation or combination with any one or more of the other examples provided above or throughout the present disclosure. Components and/or arrangement of components illustrated in one figure may be incorporated into any other figure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

It will be appreciated by those skilled in the art that the present disclosure may be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

In general, terminology may be understood at least in part from usage in context. For example, terms, such as "and", "or", or "and/or" as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The terms "including" and "comprising" should be interpreted as meaning "including but not limited to." If not already set forth explicitly in the claims, the term "a" should be interpreted as "at least one" and the terms "the, said, etc." should be interpreted as "the at least one, said at least one, etc."

The present disclosure is described with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks may occur out of the order noted in the operational illustrations. For example, two blocks shown in succession may be executed substantially concurrently or the blocks may sometimes be executed in the reverse order, depending upon the functionality/acts involved.

For the purposes of this disclosure a non-transitory computer readable medium (or computer-readable storage medium/media) stores computer data, which data may include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which may be used to tangibly store the desired information or data or instructions and which may be accessed by a computer or processor.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

It is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method for de-identifying and transforming data representations comprising:

receiving, by a de-identification and transformation system comprising a processing device and a memory storing computer-readable instructions, raw data from multiple data sources;

tokenizing, by the de-identification and transformation system, the raw data to raw tokens, the raw tokens comprising a controlled infinite vocabulary of standardized tokens with materialized uncertainty;

converting, by the de-identification and transformation system, the raw tokens to raw hash values, the raw hash values comprising an infinite vocabulary;

joining, by the de-identification and transformation system, the raw hash values across the multiple data sources to create synthetic composite hashed records ("SynCHRs");

generating, by the de-identification and transformation system, a raw embedding using a woven encrypted locality-sensitive hashing ("WELSH") process, the raw embedding comprising an array of floating point numbers representing the SynCHRs that cannot be mapped in reverse;

storing, by the de-identification and transformation system, the raw embedding in an embedding vector database;

identifying, by the de-identification and transformation system, one or more SynCHRs of the SynCHRs having a similarity to a target record by performing an indexed vector search of the embedding vector database;

aggregating, by the de-identification and transformation system, features of the one or more SynCHRs to form an aggregated feature; and appending, by the de-identification and transformation system, the aggregated feature to the target record.

2. The method of claim 1, further comprising:

tokenizing, by the de-identification and transformation system, the target record to target tokens, the target tokens comprising the controlled infinite vocabulary of standardized tokens with materialized uncertainty;

converting, by the de-identification and transformation system, the target tokens to target hash values, the target hash values comprising the infinite vocabulary;

generating, by the de-identification and transformation system, a target embedding using the WELSH process, the target embedding comprising an array of floating point numbers representing the target hash values; and storing, by the de-identification and transformation system, the target embedding in an embedding query table.

3. The method of claim 2, wherein the identifying the one or more SynCHRs having the similarity to the target record further comprises performing an indexed vector search of the embedding query table.

4. The method of claim 3, wherein the similarity is based on cosine similarity or equivalent method of vectors in one or more of the embedding vector database and the embedding query table.

5. The method of claim 1, further comprising:

receiving, by the de-identification and transformation system, a feature from a feature source;

converting, by the de-identification and transformation system, the feature to a feature hash value, the feature hash value comprising the infinite vocabulary; and associating, by the de-identification and transformation system, the feature with a SynCHR of the one or more SynCHRs using the feature hash value.

6. The method of claim 5, further comprising:

storing, by the de-identification and transformation system, the SynCHR in a SynCHR feature database.

7. The method of claim 1, wherein the materialized uncertainty comprises a restatement of one or more values of the raw data as a set of possible values that do not amplify source precision and are not combined with other source information.

8. The method of claim 1, wherein the raw hash values comprise salted hashes.

9. The method of claim 1, wherein the joining is iterative over several combinations of the multiple data sources.

10. The method of claim 1, wherein the WELSH process comprises combining hashed tokens from multiple fields in a SynCHR into a new hash value.

11. A de-identification and transformation system comprising:

a processing device operatively coupled to a memory configured to store computer-readable instructions that, when executed by the processing device, cause the processing device to:

receive raw data from multiple data sources;

tokenize the raw data to raw tokens, the raw tokens comprising a controlled infinite vocabulary of standardized tokens with materialized uncertainty;

convert the raw tokens to raw hash values, the raw hash values comprising an infinite vocabulary;

join the raw hash values across the multiple data sources to create synthetic composite hashed records ("SynCHRs");

generate a raw embedding using a woven encrypted locality-sensitive hashing ("WELSH") process, the raw embedding comprising an array of floating point numbers representing the SynCHRs that cannot be mapped in reverse;

store the raw embedding in an embedding vector database;

identify one or more SynCHRs of the SynCHRs having a similarity to a target record via an indexed vector search of the embedding vector database;

aggregate features of the one or more SynCHRs to form an aggregated feature; and append the aggregated feature to the target record.

12. The de-identification and transformation system of claim 11, wherein the processing device is further configured to:

tokenize the target record to target tokens, the target tokens comprising the controlled infinite vocabulary of standardized tokens with materialized uncertainty;

convert the target tokens to target hash values, the target hash values comprising the infinite vocabulary;

generate a target embedding using the WELSH process, the target embedding comprising an array of floating point numbers representing the target hash values; and store the target embedding in an embedding query table.

13. The de-identification and transformation system of claim 12, wherein the identify the one or more SynCHRs having the similarity to the target record further comprises performing an indexed vector search of the embedding query table.

14. The de-identification and transformation system of claim 13, wherein the similarity is based on cosine similarity or equivalent method of vectors in one or more of the embedding vector database and the embedding query table.

15. The de-identification and transformation system of claim 11, wherein the processing device is further configured to:

receive a feature from a feature source;

convert the feature to a feature hash value, the feature hash value comprising the infinite vocabulary; and associate the feature with a SynCHR of the one or more SynCHRs using the feature hash value.

16. The de-identification and transformation system of claim 15, wherein the processing device is further configured to:

store the SynCHR in a SynCHR feature database.

17. The de-identification and transformation system of claim 11, wherein the materialized uncertainty comprises a restatement of one or more values of the raw data as a set of possible values that do not amplify source precision and are not combined with other source information.

18. The de-identification and transformation system of claim 11, wherein the raw hash values comprise salted hashes.

19. The de-identification and transformation system of claim 11, wherein the joining is iterative over several combinations of the multiple data sources.

20. The de-identification and transformation system of claim 11, wherein the WELSH process comprises combining hashed tokens from multiple fields in a SynCHR into a new hash value.

21. A non-transitory computer readable storage medium configured to store one or more programs comprising computer-readable instructions that, when executed by a processing device of a de-identification and transformation system, cause the processing device to perform the functions of:

receiving raw data from multiple data sources;

tokenizing the raw data to raw tokens, the raw tokens comprising a controlled infinite vocabulary of standardized tokens with materialized uncertainty;

converting the raw tokens to raw hash values, the raw hash values comprising an infinite vocabulary;

joining the raw hash values across the multiple data sources to create synthetic composite hashed records ("SynCHRs");

generating a raw embedding using a woven encrypted locality-sensitive hashing ("WELSH") process, the raw embedding comprising an array of floating point numbers representing the SynCHRs that cannot be mapped in reverse;

storing the raw embedding in an embedding vector database;

identifying one or more SynCHRs of the SynCHRs having a similarity to a target record via an indexed vector search of the embedding vector database;

aggregating features of the one or more SynCHRs to form an aggregated feature; and appending the aggregated feature to the target record.

22. The non-transitory computer readable storage medium of claim 21, wherein the computer-readable instructions, when executed by the processing device, further cause the processing device to perform the functions of:

tokenizing the target record to target tokens, the target tokens comprising the controlled infinite vocabulary of standardized tokens with materialized uncertainty;

converting the target tokens to target hash values, the target hash values comprising the infinite vocabulary;

generating a target embedding using the WELSH process, the target embedding comprising an array of floating point numbers representing the target hash values; and storing the target embedding in an embedding query table.

23. The non-transitory computer readable storage medium of claim 22, wherein the identify the one or more SynCHRs having the similarity to the target record comprises performing an indexed vector search of the embedding query table.

24. The non-transitory computer readable storage medium of claim 23, wherein the similarity is based on cosine similarity or equivalent method of vectors in one or more of the embedding vector database and the embedding query table.

25. The non-transitory computer readable storage medium of claim 21, wherein the computer-readable instructions, when executed by the processing device, further cause the processing device to perform the functions of:

receiving a feature from a feature source;

converting the feature to a feature hash value, the feature hash value comprising the infinite vocabulary; and associating the feature with a SynCHR of the one or more SynCHRs using the feature hash value.

26. The non-transitory computer readable storage medium of claim 25, wherein the computer-readable instructions, when executed by the processing device, further cause the processing device to perform the functions of:

storing the SynCHR in a SynCHR feature database.

27. The non-transitory computer readable storage medium of claim 21, wherein the materialized uncertainty comprises a restatement of one or more values of the raw data as a set of possible values that do not amplify source precision and are not combined with other source information.

28. The non-transitory computer readable storage medium of claim 21, wherein the raw hash values comprise salted hashes.

29. The non-transitory computer readable storage medium of claim 21, wherein the joining is iterative over several combinations of the multiple data sources.

30. The non-transitory computer readable storage medium of claim 21, wherein the WELSH process comprises combining hashed tokens from multiple fields in a SynCHR into a new hash value.

* * * * *